United States Patent
Mitsuoka et al.

(10) Patent No.: US 10,471,799 B2
(45) Date of Patent: Nov. 12, 2019

(54) LEANING VEHICLE

(71) Applicant: YAMAHA HATSUDOKI KABUSHIKI KAISHA, Iwata-shi, Shizuoka (JP)

(72) Inventors: Ryuta Mitsuoka, Shizuoka (JP); Nobuhiko Hirakawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 136 days.

(21) Appl. No.: 15/913,260

(22) Filed: Mar. 6, 2018

(65) Prior Publication Data

US 2018/0257452 A1 Sep. 13, 2018

(30) Foreign Application Priority Data

Mar. 7, 2017 (JP) .................................. 2017-042844

(51) Int. Cl.
*B60K 5/08* (2006.01)
*B60G 21/05* (2006.01)
*B62D 17/00* (2006.01)

(52) U.S. Cl.
CPC ............. *B60G 21/05* (2013.01); *B62D 17/00* (2013.01); *B60G 2200/144* (2013.01)

(58) Field of Classification Search
CPC .. B60G 21/05; B60G 2200/144; B62D 17/00; B62K 5/05; B62K 5/08; B62K 5/10; B62K 5/027; B62K 5/02; B62K 19/32
USPC .................................................. 280/124.103
See application file for complete search history.

(56) References Cited

U.S. PATENT DOCUMENTS

| | | | |
|---|---|---|---|
| 9,771,118 B2* | 9/2017 | Takano | ................. B60G 13/003 |
| 2011/0006498 A1* | 1/2011 | Mercier | ................... B62D 9/02 |
| | | | 280/124.103 |
| 2014/0375015 A1 | 12/2014 | Yu | |
| 2016/0229251 A1* | 8/2016 | Mori | .................... B60G 13/003 |

(Continued)

FOREIGN PATENT DOCUMENTS

| | | |
|---|---|---|
| CN | 201670311 U | 12/2010 |
| CN | 102092434 B | 7/2014 |

(Continued)

OTHER PUBLICATIONS

Piaggio, Catalogo Parti Di Ricambio, NTRC000U01, MP3 300 ie LT, Mod. ZAPM64102, 116 pages.

(Continued)

*Primary Examiner* — Toan C To
(74) *Attorney, Agent, or Firm* — Keating and Bennett, LLP

(57) ABSTRACT

A linkage includes a lower cross member supported by a link support and provided with a rear element turnable about a turning axis behind the link support. The body frame includes an upper frame, a lower frame and a coupling frame. The upper frame and the lower frame extend rearward from the link support to intersect areas respectively located directly above and below a turning range of the rear element. A longitudinal direction of the coupling frame extends in an up-down direction of the body frame. The coupling frame couples the upper and lower frames at a location behind the rear element. A majority of a front edge of the coupling frame extends along the longitudinal direction as viewed from a left-right direction of the body frame when the leaning vehicle is in an upright condition.

7 Claims, 11 Drawing Sheets

(56) References Cited

U.S. PATENT DOCUMENTS

| | | | |
|---|---|---|---|
| 2016/0375948 A1* | 12/2016 | Takenaka | B62K 5/10 |
| | | | 280/5.506 |
| 2017/0088217 A1* | 3/2017 | Ohno | B60G 17/0155 |
| 2017/0088221 A1* | 3/2017 | Ohno | B60G 13/005 |
| 2017/0088222 A1* | 3/2017 | Ohno | B62K 21/18 |
| 2017/0088223 A1* | 3/2017 | Hirakawa | B60G 21/026 |
| 2018/0257729 A1* | 9/2018 | Mitsuoka | B62K 25/08 |
| 2018/0257730 A1* | 9/2018 | Mitsuoka | B62K 5/027 |
| 2018/0281886 A1* | 10/2018 | Mizuno | B62D 9/02 |
| 2019/0144035 A1* | 5/2019 | Doerksen | B62D 9/02 |
| | | | 280/124.103 |
| 2019/0232749 A1* | 8/2019 | Di Tanna | B60G 3/20 |

FOREIGN PATENT DOCUMENTS

| | | |
|---|---|---|
| EP | 3 067 263 A1 | 9/2016 |
| EP | 3 069 979 A2 | 9/2016 |
| EP | 3 450 289 A1 | 3/2019 |
| WO | 2017/208992 A1 | 12/2017 |

OTHER PUBLICATIONS

Official Communication issued in European Patent Application No. 18160411.7, dated Aug. 3, 2018.

\* cited by examiner

LEANING VEHICLE

CROSS REFERENCE TO RELATED APPLICATIONS

This application claims the benefit of priority to Japanese Patent Application No. 2017-042844 filed on Mar. 7, 2017. The entire contents of this application are hereby incorporated herein by reference.

BACKGROUND OF THE INVENTION

1. Field of the Invention

The present invention relates to a leaning vehicle including a leanable body frame and two front wheels.

2. Description of the Related Art

A leaning vehicle described in Catalogo partidi ricambio, MP3 300ie LT Mod. ZAPM64102, Piaggio includes a vehicle body frame and two front wheels that are arranged side by side in a left-right direction of the vehicle body frame. The leaning vehicle further includes a linkage. The linkage is configured so as to change relative positions of the two front wheels relative to the body frame to cause the body frame to lean to the left or right of the leaning vehicle when the leaning vehicle so turns.

The linkage is a so-called parallelogram type linkage that includes an upper cross member, a lower cross member, a left side member and a right side member. The upper cross member, the lower cross member, the left side member and the right side member are connected so that the upper cross member and the lower cross member maintain postures that are parallel to each other and the left side member and the right side member maintain postures that are parallel to each other.

The lower cross member is disposed below the upper cross member in an up-down direction of the vehicle body frame. The vehicle body frame includes a link support that supports the linkage. The upper cross member is supported on the link support so as to turn about an upper turning axis that extends in a front-rear direction of the vehicle body frame. The lower cross member is supported on the link support so as to turn about a lower turning axis that extends in the front-rear direction of the vehicle body frame.

When the upper cross member and the lower cross member change the relative positions of the two front wheels to the vehicle body frame to cause the vehicle body frame to lean to the left or right of the leaning vehicle, the upper cross member and the lower cross member turn about the upper turning axis and the lower turning axis, relatively, while continuing to be parallel to each other.

The lower cross member includes a front element that is disposed ahead of the link support and a rear element that is disposed behind the link support.

The vehicle body frame includes an upper frame and a lower frame. The upper frame extends from the link support rearward in the front-rear direction of the vehicle body frame so as to intersect an area located directly above a turning range of the rear element of the lower cross member. The lower frame extends from the link support rearward in the front-rear direction of the vehicle body frame so as to intersect an area located directly below the turning range of the rear element of the lower cross member.

The vehicle body frame includes a coupling frame. The coupling frame extends in the front-rear direction of the vehicle body frame to couple the upper frame and the lower frame together. A portion of the link support, a portion of the upper frame, a portion of the lower frame and the coupling frame define a frame structure that surrounds the rear element of the lower cross member when the leaning vehicle is viewed from the left or right side thereof.

With leaning vehicles like the one described above, there exists a demand to increase a maximum leaning angle (a bank angle) of the vehicle body frame to increase a leaning vehicle running speed. To provide a greater bank angle, the movable range of the linkage needs to be expanded.

When attempting to meet the above demand with the leaning vehicle described in Catalogo partidi ricambio, MP3 300ie LT Mod. ZAPM64102, Piaggio, it is necessary to provide a wide space between the upper frame and the lower frame that extend so as to intersect areas respectively located directly above and directly below the movable range of the rear element of the lower cross member. This increases the frame structure that surrounds the rear element. As a result, it is not avoidable to enlarge the vehicle body frame in size.

SUMMARY OF THE INVENTION

Preferred embodiments of the present invention prevent the enlargement in size of vehicle body frames while meeting the demand to increase a bank angle.

According to a preferred embodiment of the present invention, a leaning vehicle includes a body frame that leans leftward when the leaning vehicle turns leftward in a left-right direction of the leaning vehicle and leans rightward when the leaning vehicle turns rightward in the left-right direction of the leaning vehicle; a left front wheel and a right front wheel that are arranged side by side in a left-right direction of the body frame; a left suspension supporting the left front wheel; a right suspension supporting the right front wheel; and a linkage that changes relative positions of the left front wheel and the right front wheel to the body frame to cause the body frame to lean leftward or rightward of the leaning vehicle, wherein the linkage includes: an upper cross member; and a lower cross member disposed below the upper cross member in an up-down direction of the body frame; a left side member disposed above the left front wheel in the up-down direction of the body frame, and supporting the left suspension turnably about a left steering axis extending in the up-down direction of the body frame; and a right side member disposed above the right front wheel in the up-down direction of the body frame, and supporting the right suspension turnably about a right steering axis extending in the up-down direction of the body frame; the upper cross member, the lower cross member, the left side member, and the right side member are turnably connected with one another such that the upper cross member and the lower cross member maintain postures that are parallel to each other, and such that the left side member and the right side member maintain postures that are parallel to each other; the body frame includes a link support supporting the linkage; at least one of the upper cross member and the lower cross member includes a front element turnable about a turning axis extending in a front-rear direction of the body frame at a location ahead of the link support in the front-rear direction of the body frame; and a rear element turnable about the turning axis at a location behind the link support in the front-rear direction of the body frame; the body frame further includes an upper frame extending from the link support rearward in the front-rear direction of the body frame so as to intersect an area located directly above a turning range of the rear element in the up-down direction of the body frame; a lower frame extending from the link support rearward in the front-rear direction of the body frame so as to intersect an area located directly below the turning range of the rear element in the up-down direction of the body frame; and a coupling frame extending in a longitudinal direction corresponding to the up-down direction of the body frame, and coupling the upper frame and the lower frame together at a location behind the link support in the front-rear direction of the body frame; and a majority of a front edge of the coupling frame extends in the longitudinal direction as viewed from the left-right direction of the body frame when the leaning vehicle is in an upright condition.

The inventors conceived that the frame structure surrounding the rear element of the lower cross member is able to be reduced in size by providing a coupling frame that couples the upper frame and the lower frame together such that the longitudinal direction corresponds to the up-down direction of the vehicle body frame, thus allowing the coupling frame to be located closer to the rear element of the lower cross member. Reducing the size of the frame structure makes it possible not only to prevent the enlargement in size of the vehicle body frame but also to enhance the rigidity of the frame structure. The inventors also discovered that such a frame structure solves a specific problem of leaning vehicles that include the two front wheels that are arranged to be aligned side by side in the left-right direction of the vehicle body frame.

In the leaning vehicle that includes the two front wheels described above, there is a situation in which a force acting on the left front wheel differs from a force acting on the right front wheel. For example, the situation described above may occur when the condition of a road surface with which the left front wheel is in contact differs from the condition of a road surface with which the right front wheel is in contact.

For example, in the case where a resisting force acting on the right front wheel is greater than a resisting force acting on the left front wheel, a force that is inputted into a right portion of the lower cross member by way of the right suspension and a lower portion of the right side member becomes greater than a force that is inputted into a left portion of the lower cross member by way of the left suspension and a lower portion of the left side member. As a result, a clockwise force acts on the lower cross member when the leaning vehicle is viewed from above in the up-down direction of the vehicle body frame.

On the other hand, due to this reaction, a force that is inputted into a left portion of the upper cross member by way of an upper portion of the left side member becomes greater than a force that is inputted into a right portion of the upper cross member by way of an upper portion of the right side member. As a result, a counterclockwise force acts on the upper cross member when the leaning vehicle is viewed from above in the up-down direction of the vehicle body frame.

Namely, the clockwise force acts on a lower portion of the link support that supports the lower cross member when the leaning vehicle is viewed from above in the up-down direction of the vehicle body frame, and the counterclockwise force acts on the upper portion of the link support that supports the upper cross member when the leaning vehicle is viewed from above in the up-down direction of the vehicle body frame. As a result, a torsional force acts on the link support.

This torsional force acts on the upper frame that extends rearward from the link support as a counterclockwise force acting about the link support when the leaning vehicle is viewed from above in the up-down direction of the vehicle body frame. On the other hand, the torsional force acts on the lower frame that extends rearward from the link support as a clockwise force acting about the link support when the leaning vehicle is viewed from above in the up-down direction of the vehicle body frame.

The inventors discovered that a deflection of the upper frame and the down frame that would be caused by the torsional force described above is prevented or significantly reduced by coupling the upper frame and the lower frame together with the coupling frame that extends such that the longitudinal direction thereof corresponds to the up-down direction of the vehicle body frame. The amount of deflection that would be caused in the upper frame and the lower frame by the torsional force when no countermeasure is taken becomes greater as the upper frame and the down frame extend farther away from the link support. Consequently, a structure that prevents or significantly reduces a deflection is provided desirably in a position located as close to the link support as possible.

According to the structure described above, a majority of the front edge of the coupling frame that corresponds to the longitudinal direction thereof extends in the up-down direction of the vehicle body frame. Therefore, the coupling frame is disposed close to the rear element of the lower cross member. Thus, not only the frame structure surrounding the rear element is smaller in size but also the deflection is prevented or significantly reduced that would be generated in the upper frame and the down frame by the torsional force that acts on the link support. As a result, the rigidity of the frame structure is also enhanced.

Thus, it is possible not only to prevent the enlargement in size of the vehicle body frame while meeting the demand to increase the bank angle of the leaning vehicle that includes the leanable vehicle body frame and the two front wheels but also to enhance the rigidity of the vehicle body frame against the torsional force that acts on the link support that is specific to leaning vehicles as described above.

According to a preferred embodiment of the present invention, the front edge of the coupling frame preferably directly faces a surface of the rear element that faces rearward in the front-rear direction of the body frame.

In the present disclosure, the expression "directly faces" means that nothing exists between two objects facing each other. According to this structure, it is easy to satisfy the requirement to dispose the coupling frame close to the rear element of the lower cross member.

According to a preferred embodiment of the present invention, a first angle between the longitudinal direction of the coupling frame and the up-down direction of the body frame as viewed from the left-right direction of the body frame when the leaning vehicle is in the upright condition has a value between a second angle between a longitudinal direction of the link support and the up-down direction of the body frame as viewed from the left-right direction of the body frame when the leaning vehicle is in the upright condition; and a third angle between a plane perpendicular to the turning axis and the up-down direction of the body frame as viewed from the left-right direction of the body frame when the leaning vehicle is in the upright condition.

According to this structure, it is easy to satisfy the requirement to dispose the coupling frame close to the link support while preventing interference with the rear element of the lower cross member that turns about the lower intermediate leaning turning axis.

According to a preferred embodiment of the present invention, a first angle between the longitudinal direction of the coupling frame and the up-down direction of the body frame is smaller than a second angle between a longitudinal direction of the link support and the up-down direction of the body frame, as viewed from the left-right direction of the body frame when the leaning vehicle is in the upright condition.

In order to significantly reduce or minimize the turning angle of the linkage due to a change in the road surface condition at the ground contact points of the front wheels, the third angle may be zero or a value that is as close to zero as possible, whereas the second angle that generally corresponds to a caster angle needs to have a greater value than zero to provide a desirable running characteristic of the leaning vehicle. To enhance the rigidity of the frame structure in these situations, an upper end of the coupling frame should be disposed close to the link support while preventing interference of a lower end of the coupling frame with the rear element of the lower cross member. As a result, the direction in which the coupling frame extends close to the up-down direction of the vehicle body frame, and the first angle becomes smaller than the second angle. This provides a desired caster angle that is compatible with the rigidity of the frame structure.

According to a preferred embodiment of the present invention, at least one of the upper frame and the lower frame includes a branch member including a proximal end connected to the link support; a first branch branching from the proximal end and supporting the rear element; and a second branch branching from the proximal end and connected with one end of the coupling frame.

As has been described above, it is desirable that the structure to prevent or significantly reduce the distortion in the upper frame and the lower frame by the torsional force acting on the link support is provided in a position located as close to the link support as possible. According to the structure described above, it is easy to satisfy the requirement to dispose the coupling frame close to the link support.

According to a preferred embodiment of the present invention, the upper frame includes a left upper frame extending from the link support leftward in the left-right direction of the body frame and rearward in the front-rear direction of the body frame; and a right upper frame extending from the link support rightward in the left-right direction of the body frame and rearward in the front-rear direction of the body frame; the lower frame includes a left lower frame extending from the link support leftward in the left-right direction of the body frame and rearward in the front-rear direction of the body frame; and a right lower frame extending from the link support rightward in the left-right direction of the body frame and rearward in the front-rear direction of the body frame; and the coupling frame includes a left coupling frame coupling the left upper frame and the left lower frame together; and a right coupling frame coupling the right upper frame and the right lower frame together.

For example, in the case where a counterclockwise force acts on an upper portion of the link support surrounding the upper cross member when the leaning vehicle is viewed from above in the up-down direction of the vehicle body frame, a compressive force acts on the left upper frame, whereas a tensile force acts on the right upper frame. Consequently, stress generated in the upper portion of the link support is able to be respectively transformed by the left upper frame and the right upper frame into differently-directed forces to be absorbed. As a result, it is possible to enhance the rigidity of the upper frame.

Similarly, in the case where a clockwise force acts on a lower portion of the link support supporting the lower cross member when the leaning vehicle is viewed from above in the up-down direction of the vehicle body frame, a tensile force acts on the left lower frame, whereas a compressive force acts on the right lower frame. Consequently, stress generated in the lower portion of the link support is able to be respectively transformed by the left lower frame and the right lower frame into differently-directed forces to be absorbed. As a result, it is possible to enhance the rigidity of the lower frame.

On the other hand, the differently-directed forces act on the left upper frame and the left lower frame, thus generating a force that distorts both the left upper frame and the left lower frame in the front-rear direction of the vehicle body frame. However, since the left upper frame and the left lower frame are coupled together with the left coupling frame, it is possible to prevent or significantly reduce the distortion that would be generated by the torsional force. As a result, it is possible to enhance the rigidity of a frame structure that is defined by a portion of the link support, a portion of the left upper frame, a portion of the left lower frame, and the left coupling frame.

Similarly, the differently-directed forces also act on the right upper frame and the right lower frame, thus generating a force that distorts both the right upper frame and the right lower frame in the front-rear direction of the vehicle body frame. However, since the right upper frame and the right lower frame are coupled together with the right coupling frame, it is possible to prevent or significantly reduce the distortion that would be generated by the torsional force. As a result, it is possible to enhance the rigidity of a frame structure that is defined by a portion of the link support, a portion of the right upper frame, a portion of the right lower frame and the right coupling frame.

According to a preferred embodiment of the present invention, the upper frame includes an upper branch member including an upper proximal end connected to the link support; a left upper branch branching from the upper proximal end and defining a portion of the left upper frame; and a right upper branch branching from the upper proximal end and defining a portion of the right upper frame; the lower frame includes a lower branch member including a lower proximal end connected to the link support; a left lower branch branching from the lower proximal end and defining a portion of the left lower frame; and a right lower branch branching from the lower proximal end and defining a portion of the right lower frame; the left coupling frame couples the left upper branch and the left lower branch; and the right coupling frame couples the right upper branch and the right lower branch.

As has been described above, it is desirable that the structure to prevent or significantly reduce distortion generated in the upper frame and the lower frame by the torsional force acting on the link support is provided in a position located as close to the link support as possible. According to the structure described above, it is easy to satisfy the requirement to dispose the left coupling frame and the right coupling frame close to the link support.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
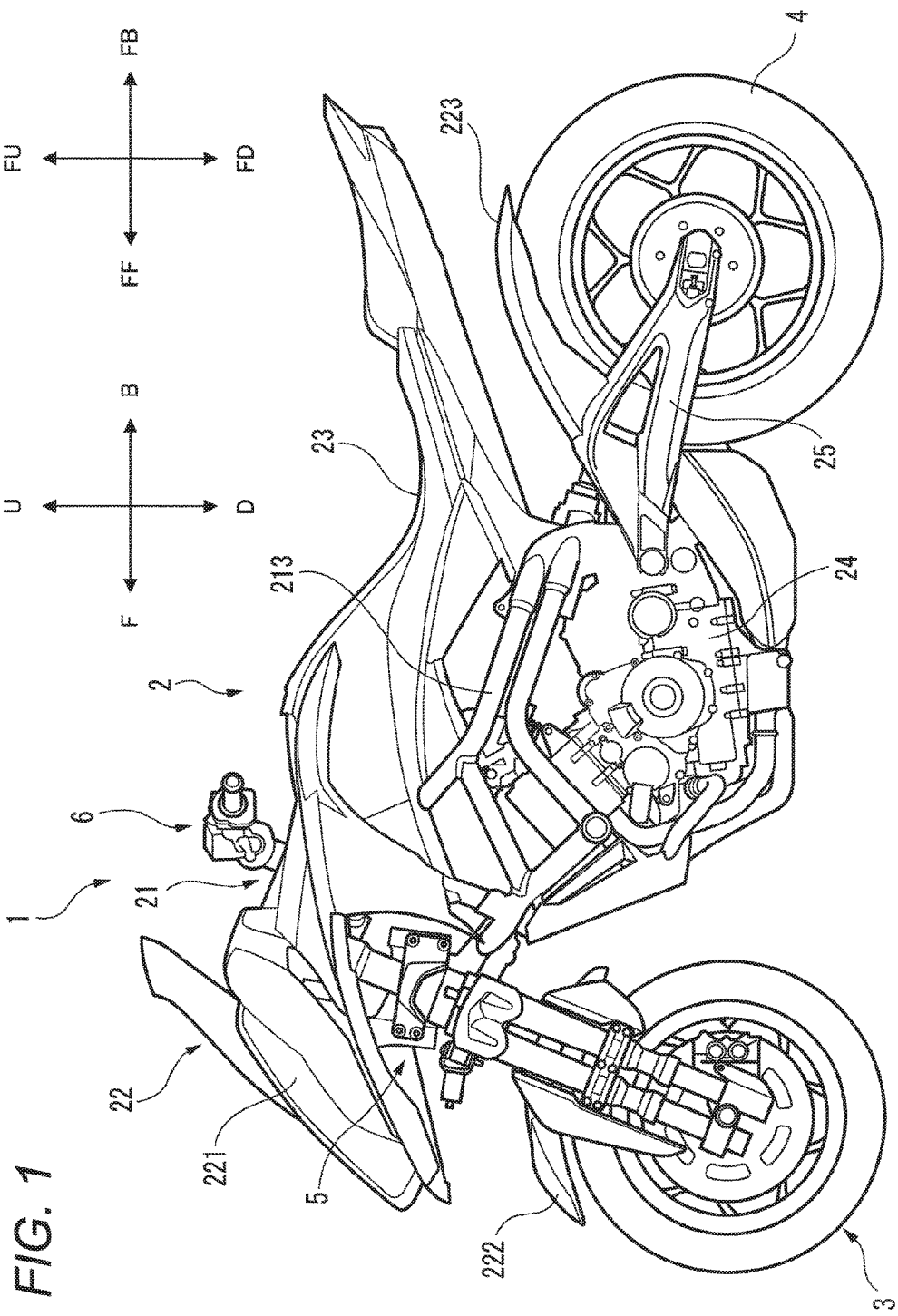
FIG. 1 is a left side view entirely illustrating a leaning vehicle according to a preferred embodiment of the present invention.

Referring to the accompanying drawings, exemplary preferred embodiments of the present invention will be described in detail below.

In the accompanying drawings, an arrow F denotes a front or forward direction of a leaning vehicle. An arrow B denotes a back/rear or backward/rearward direction of the leaning vehicle. An arrow U denotes an up or upward direction of the leaning vehicle. An arrow D denotes a down or downward direction of the leaning vehicle. An arrow R denotes a right or rightward direction of the leaning vehicle. An arrow L denotes a left or leftward direction of the leaning vehicle.

A leaning vehicle turns with a body frame being caused to lean to the left or right of the leaning vehicle from a vertical direction. In addition to the directions based on the leaning vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" refer to a front-rear direction, a left-right direction, and an up-down direction based on the body frame when viewed from a rider who rides the leaning vehicle. "A side of or sideways of the body frame" refers to directly on the right or left in the left-right direction of the body frame.

In this description, an expression "extending in the front-rear direction of the leaning vehicle body frame" includes extending while being inclined in relation to the front-rear direction of the leaning vehicle body frame and means that it extends in a direction closer to the front-rear direction of the leaning vehicle body frame than the left-right direction and up-down direction of the leaning vehicle body frame.

In this description, an expression "extending in the left-right direction of the leaning vehicle body frame" includes extending while being inclined in relation to the left-right direction of the leaning vehicle body frame and means that it extends in a direction closer to the left-right direction of the leaning vehicle body frame than the front-rear direction and up-down direction of the leaning vehicle body frame.

In this description, an expression "extending in the up-down direction of the leaning vehicle body frame" includes extending while being inclined in relation to the up-down direction of the leaning vehicle body frame and means that it extends in a direction closer to the up-down direction of the leaning vehicle body frame than the left-right direction and front-rear direction of the leaning vehicle body frame.

In this description, an expression reading the "leaning vehicle is standing upright or in an upright state" or the "body frame is standing upright or in the upright state" refers to a state in which the leaning vehicle is not steered at all and the up-down direction of the body frame coincides with the vertical direction. In this state, the directions based on the leaning vehicle coincide with the directions based on the body frame. When the leaning vehicle is turning with the body frame caused to lean to the left or right from the vertical direction, the left-right direction of the leaning vehicle does not coincide with the left-right direction of the body frame. Similarly, the up-down direction of the leaning vehicle does not coincide with the up-down direction of the body frame. However, the front-rear direction of the leaning vehicle coincides with the front-rear direction of the body frame.

In this description, an expression reading "directly on the left of a member A in the left-right direction of the body frame" denotes a space through which the member A passes when the member A is moved to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is moved to the left in the left-right direction of the body frame but also a space which extends from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is moved upwards in the up-down direction of the body frame. An expression reading "directly below the member A" is also defined in the same way.

In this description, an expression reading "above the member A in the up-down direction of the body frame" includes not only the space through which the member A passes when the member A is moved upwards in the up-down direction of the body frame but also a space which extends from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is moved to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is moved to the front in the front-rear direction of the body frame but also a space which extends from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

Referring to FIGS. 1 to 10, a leaning vehicle 1 according to preferred embodiments of the present invention will be described. As illustrated in FIG. 1, the leaning vehicle 1 includes a leaning vehicle main body 2, two front wheels 3, a rear wheel 4, a linkage 5 and a steering member 6. The leaning vehicle 1 is a leaning vehicle that includes a leanable body frame and the two front wheels that are arranged side by side in a left-right direction of the body frame.

The leaning vehicle main body 2 includes a body frame 21, a body cover 22, a seat 23, an engine unit 24, and a rear arm 25.

In FIG. 1, the body frame 21 is in an upright state. The following description to be made while referring to FIG. 1 is based on the premise that the body frame 21 is in the upright state. FIG. 1 is a left side view of the leaning vehicle 1 when the entire leaning vehicle 1 is viewed from the left in the left-right direction of the body frame 21.

Figure 2:
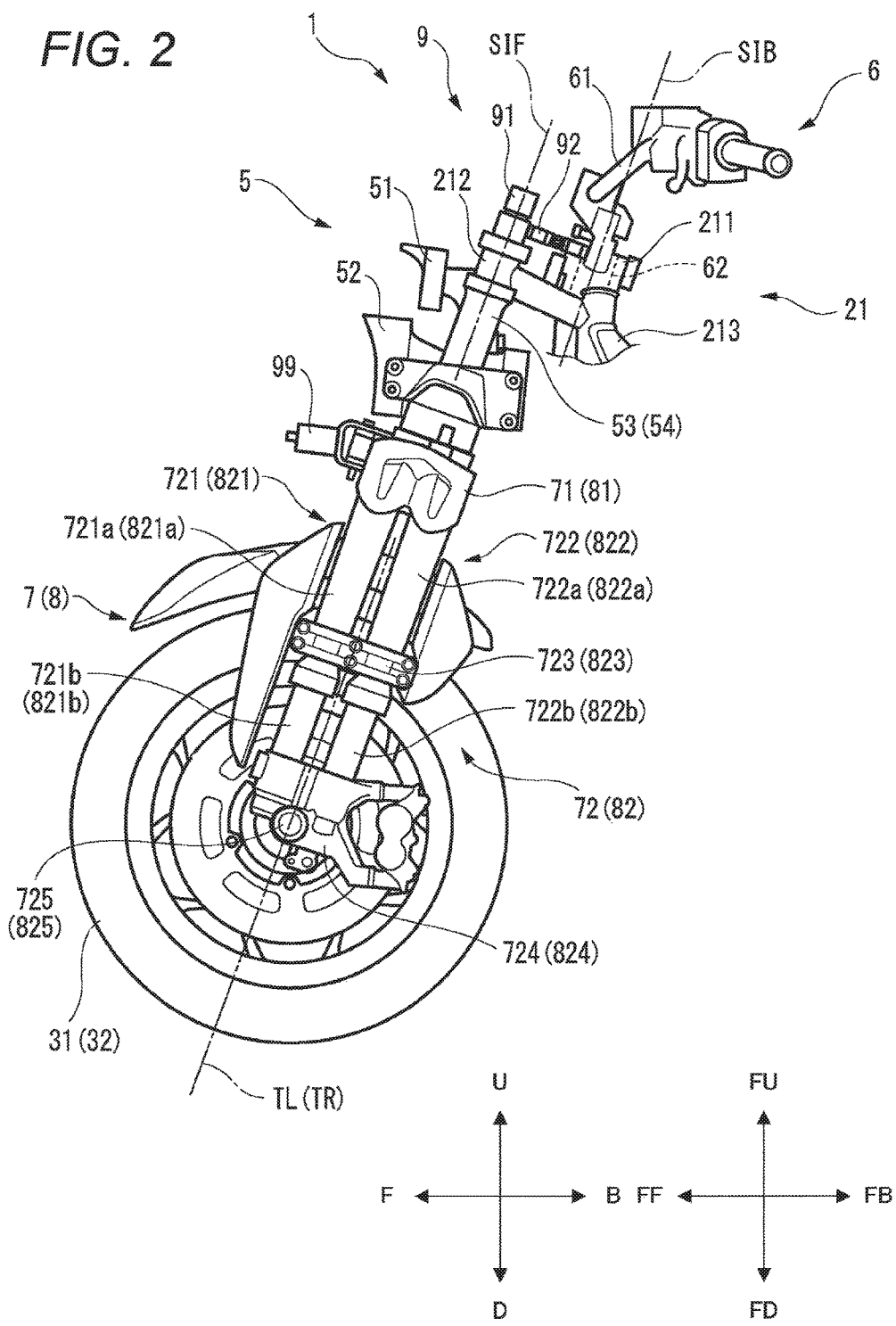
FIG. 2 is a left side view illustrating a front portion of the leaning vehicle of FIG. 1 in an enlarged manner.

FIG. 2 is a side view of a front portion of the leaning vehicle 1 when the front portion is viewed from the left in the left-right direction of the body frame 21. In FIG. 2, the body frame 21 is in the upright state. The following description to be made while referring to FIG. 2 is based on the premise that the body frame 21 is in the upright state.

The body frame 21 includes a head pipe 211, a link support 212 and a main frame 213. The head pipe 211 supports the steering member 6. The link support 212 supports the linkage 5. The main frame 213 supports the seat 23, the engine unit 24 and the rear arm 25.

The rear arm 25 is disposed behind the main frame 213 in a front-rear direction of the body frame 21. The rear arm 25 extends in the front-rear direction of the body frame 21. A front end of the rear arm 25 is supported by the main frame 213 and the engine unit 24, so that the front end of the rear arm 25 is allowed to turn about an axis that extends in the left-right direction of the body frame 21. A rear end of the rear arm 25 supports the rear wheel 4.

The body cover 22 at least partially covers elements of the leaning vehicle 1. The body cover 22 includes a front cover 221, a pair of left and right front fenders 222 and a rear fender 223.

As illustrated in FIG. 1, the front cover 221 is disposed ahead of the seat 23 in the front-rear direction of the body frame 21. The front cover 221 covers the linkage 5, the steering member 6 and at least a portion of a steering force transmission 9. The front cover 221 is not displaced relative to the body frame 21. In FIG. 2, the front cover 221 is omitted from illustration.

At least portions of the pair of left and right front fenders 222 are disposed directly below the front cover 221. At least portions of the pair of left and right front fenders 222 are disposed directly above the pair of left and right front wheels 3, respectively.

At least a portion of the rear wheel 4 is disposed below the seat 23 in an up-down direction of the body frame 21. At least a portion of the rear wheel 4 is disposed directly below the rear fender 223 in the up-down direction of the body frame 21.

The leaning vehicle 1 according to the present preferred embodiment is a leaning vehicle on which a rider rides in a posture in which the rider sits astride the body frame 21. Namely, when the rider sits on the seat 23, a portion of the body frame 21 which is disposed ahead of the seat 23 in the front-rear direction of the body frame 21 is disposed between the legs of the rider. The rider rides the leaning vehicle 1 in a posture in which he or she holds the main frame 213 or the front cover 221 that is positioned ahead of the seat 23 in the front-rear direction of the body frame 21 with his or her legs therebetween.

When viewing the leaning vehicle 1 from the left-right direction of the body frame 21, the engine unit 24 is disposed ahead of a front end of the rear wheel 4 in the front-rear direction of the body frame 21. The engine unit 24 is not displaced relative to the body frame 21. The engine unit 24 is not displaced relative to the main frame 213. The engine unit 24 generates power to drive the leaning vehicle 1. The driving force is transmitted to the rear wheel 4.

The head pipe 211 is disposed at a front portion of the leaning vehicle 1. When viewing the leaning vehicle 1 from the left in the left-right direction of the body frame 21, an upper portion of the head pipe 211 is disposed behind a lower portion of the head pipe 211 in the front-rear direction of the body frame 21.

The steering member 6 includes a handlebar 61 and an upstream-side steering shaft 62. The upstream-side steering shaft 62 extends downwards from an intermediate portion of the handlebar 61 in relation to the left-right direction thereof. The upstream-side steering 62 is supported on the head pipe 211 via a rear intermediate steering bearing portion (not illustrated). By using this structure, the upstream-side steering shaft 62 is able to turn about a rear intermediate steering turning axis SIB relative to the head pipe 211.

The link support 212 is disposed directly ahead of the head pipe 211 in the front-rear direction of the body frame 21. When viewing the leaning vehicle 1 from the left in the left-right direction of the body frame 21, an upper portion of the link support 212 is disposed behind a lower portion of the link support 212 in the front-rear direction of the body frame 21.

Figure 3:
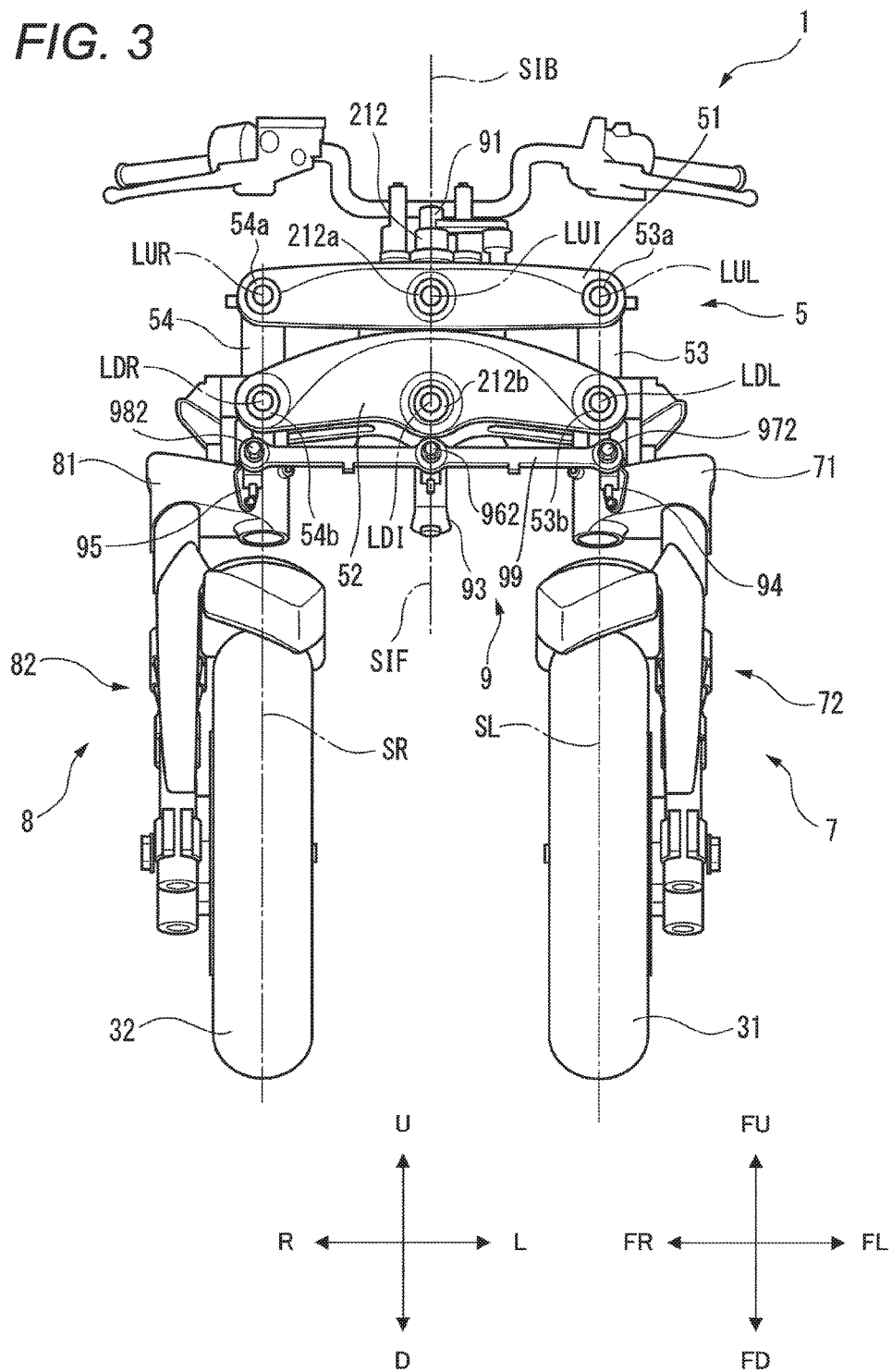
FIG. 3 is a front view illustrating the front portion of the leaning vehicle of FIG. 1.

FIG. 3 is a front view of the leaning vehicle 1 when the front portion of the leaning vehicle 1 is viewed from the front in the front-rear direction of the body frame 21. In FIG. 3, the body frame 21 is in the upright state. The following description to be made while referring to FIG. 3 is based on the premise that the body frame 21 is in the upright state. In FIG. 3, the front cover 221 is omitted from illustration.

The two front wheels 3 include a left front wheel 31 and a right front wheel 32. The left front wheel 31 is disposed on the left of the head pipe 211 and the link support 212 of the body frame 21 in the left-right direction of the body frame 21. The right front wheel 32 is disposed on the right of the head pipe 211 and the link support 212 in the left-right direction of the body frame 21. The left front wheel 31 and the right front wheel 32 are arranged side by side in the left-right direction of the body frame 21.

In the leaning vehicle 1 according to the present preferred embodiment, the linkage 5 preferably includes a four parallel joint link system (also referred to as a parallelogram link).

The linkage 5 is disposed above the left front wheel 31 and the right front wheel 32 in the up-down direction of the body frame 21. The linkage 5 includes an upper cross member 51, a lower cross member 52, a left side member 53 and a right side member 54. The linkage 5 is not interlocked with the turning of the upstream-side steering shaft 62 about the rear intermediate steering turning axis SIB which occurs in association with the operation of the handlebar 61. Namely, the linkage 5 does not turn about the rear intermediate steering turning axis SIB relative to the body frame 21.

The link support 212 includes an upper intermediate leaning bearing portion 212a. An intermediate portion of the upper cross member 51 is supported by the link support 212 via the upper intermediate leaning bearing portion 212a. The upper cross member 51 is able to turn relative to the link support 212 about an upper intermediate leaning turning axis LUI that passes through the upper intermediate leaning bearing portion 212a and extends in the front-rear direction of the body frame 21.

The link support 212 includes a lower intermediate leaning bearing portion 212b. An intermediate portion of the lower cross member 52 is supported by the link support 212 via the lower intermediate leaning bearing portion 212b. The lower cross member 52 is able to turn relative to the link support 212 about a lower intermediate leaning turning axis LDI that passes through the lower intermediate leaning bearing portion 212b and extends in the front-rear direction of the body frame 21.

The left side member 53 includes an upper left leaning bearing portion 53a. A left end of the upper cross member 51 is coupled with the left side member 53 via the upper left leaning bearing portion 53a. The upper cross member 51 is able to turn relative to the left side member 53 about an upper left leaning turning axis LUL that passes through the upper left leaning bearing portion 53a and extends in the front-rear direction of the body frame 21.

The right side member 54 includes an upper right leaning bearing portion 54a. A right end of the upper cross member 51 is coupled with the right side member 54 via the upper right leaning bearing portion 54a. The upper cross member 51 is able to turn relative to the right side member 54 about an upper right leaning turning axis LUR that passes through the upper right leaning bearing portion 54a and extends in the front-rear direction of the body frame 21.

The left side member 53 includes a lower left leaning bearing portion 53b. A left end of the lower cross member 52 is coupled with the left side member 53 via the lower left leaning bearing portion 53b. The lower cross member 52 is able to turn relative to the left side member 53 about a lower left leaning turning axis LDL that passes through the lower left leaning bearing portion 53b and extends in the front-rear direction of the body frame 21.

The right side member 54 includes a lower right leaning bearing portion 54b. A right end of the lower cross member 52 is coupled with the right side member 54 via the lower right leaning bearing portion 54b. The lower cross member 52 is able to turn relative to the right side member 54 about a lower right leaning turning axis LDR that passes through the lower right leaning bearing portion 54b and extends in the front-rear direction of the body frame 21.

Figure 4:
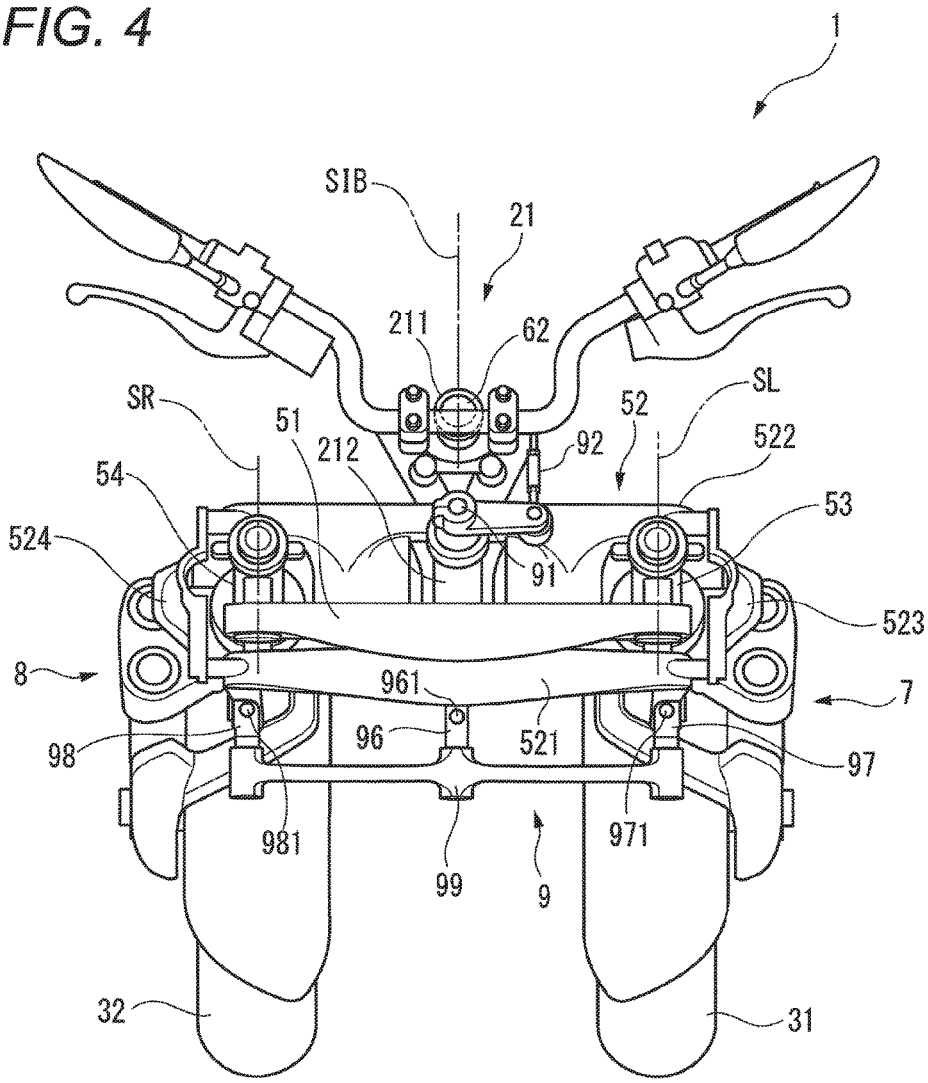
FIG. 4 is a plan view illustrating the front portion of the leaning vehicle of FIG. 1.
Figure 4:
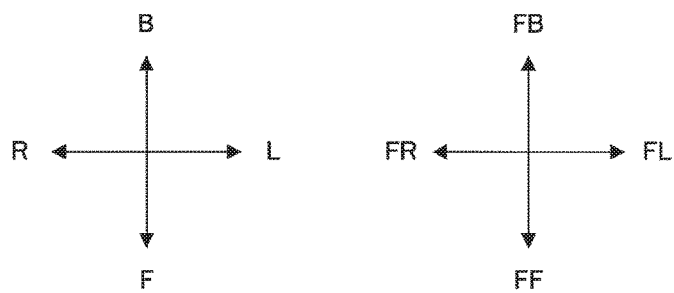

FIG. 4 is a plan view of the front portion of the leaning vehicle 1 when it is viewed from above in the up-down direction of the body frame 21. In FIG. 4, the body frame 21 is in the upright state. The following description to be made while referring to FIG. 4 is based on the premise that the body frame 21 is in the upright state. In FIG. 4, the front cover 221 is omitted from illustration.

The upper cross member 51 is disposed ahead of the link support 212 in the front-rear direction of the body frame 21. The upper cross member 51 is a plate-shaped member that extends in the left-right direction of the body frame 21 without being curved in the front-rear direction of the body frame 21.

As illustrated in FIGS. 2 and 4, the lower cross member 52 is disposed below the upper cross member 51 in the up-down direction of the body frame 21. The lower cross member 52 includes a front element 521 and a rear element 522. The front element 521 is disposed ahead of the link support 212, the left side member 53 and the right side member 54 in the front-rear direction of the body frame 21. The rear element 522 is disposed behind the link support 212, the left side member 53 and the right side member 54 in the front-rear direction of the body frame 21. The front element 521 and the rear element 522 extend in the left-right direction of the body frame 21 without being curved in the front-rear direction of the body frame 21.

As illustrated in FIG. 4, the lower cross member 52 includes a left coupling member 523 and a right coupling member 524. The left coupling member 523 couples a left end of the front element 521 and a left end of the rear element 522 together. The right coupling member 524 couples a right end of the front element 521 and a right end of the rear element 522 together.

As illustrated in FIGS. 3 and 4, the left side member 53 is disposed directly on the left of the link support 212 in the left-right direction of the body frame 21. The left side member 53 is disposed above the left front wheel 31 in the up-down direction of the body frame 21. The left side member 53 extends in a direction in which the link support 212 extends. An upper portion of the left side member 53 is disposed behind a lower portion thereof in the front-rear direction of the body frame 21.

As illustrated in FIGS. 3 and 4, the right side member 54 is disposed directly on the right of the link support 212 in the left-right direction of the body frame 21. The right side member 54 is disposed above the right front wheel 32 in the up-down direction of the body frame 21. The right side member 54 extends in the direction in which the link support 212 extends. An upper portion of the right side member 54 is disposed behind a lower portion thereof in the front-rear direction of the body frame 21.

The upper cross member 51, the lower cross member 52, the left side member 53 and the right side member 54 are supported on the link support 212 so that the upper cross member 51 and the lower cross member 52 maintain a posture in which the upper cross member 51 and the lower cross member 52 are parallel to each other and that the left side member 53 and the right side member 54 maintain a posture in which the left side member 53 and the right side member 54 are parallel to each other.

As illustrated in FIGS. 2 to 4, the leaning vehicle 1 includes a left suspension 7. The left suspension 7 includes a left bracket 71 and a left shock absorber 72.

The left bracket 71 includes a left turnable member (not shown) at an upper portion thereof. The left turnable member is disposed in an interior portion of the left side member 53 and extends in the same direction as a direction in which the left side member 53 extends. The left side member 53 includes a left steering bearing portion (not shown). The left turnable member is supported by the left side member 53 via the left steering bearing portion. By using this structure, the left turnable member is able to turn relative to the left side member 53 about the left steering turning axis SL. Namely, the left bracket 71 is coupled with the left side member 53 so as to turn relative to the left side member 53 about the left steering turning axis SL.

The left steering turning axis SL extends in the direction in which the left side member 53 extends. As illustrated in FIG. 3, the left steering turning axis SL extends parallel to the rear intermediate steering turning axis SIB of the upstream-side steering shaft 62 in the up-down direction of the body frame 21. As illustrated in FIG. 4, the left steering turning axis SL extends parallel to the rear intermediate steering turning axis SIB of the upstream-side steering shaft 62 in the front-rear direction of the body frame 21.

The left shock absorber 72 is preferably a so-called telescopic shock absorber. The left shock absorber 72 attenuates or absorbs a displacement of the left front wheel 31 relative to the linkage 5 in the up-down direction of the body frame 21. As illustrated in FIG. 2, the left shock absorber 72 includes a left front telescopic element 721, a left rear telescopic element 722, a left upper coupling member 723, a left lower coupling member 724 and a left through hole 725.

The left front telescopic element 721 includes a left front outer tube 721a and a left front inner tube 721b. An outer diameter of the left front outer tube 721a is greater than an outer diameter of the left front inner tube 721b. The left front outer tube 721a is supported by the left bracket 71. The left front inner tube 721b is coupled with the left front outer tube 721a so as to be slidable relative to the left front outer tube 721a along a left telescoping axis TL.

The left rear telescopic element 722 includes a left rear outer tube 722a and a left rear inner tube 722b. An outer diameter of the left rear outer tube 722a is greater than an outer diameter of the left rear inner tube 722b. The left rear outer tube 722a is disposed directly behind the left front outer tube 721a in the front-rear direction of the body frame 21. The left rear outer tube 722a is supported by the left bracket 71. The left rear inner tube 722b is disposed directly behind the left front inner tube 721b in the front-rear direction of the body frame 21. The left rear inner tube 722b is coupled with the left rear outer tube 722a so as to be slidable relative to the left rear outer tube 722a along the left telescoping axis TL.

The left upper coupling member 723 couples the left front outer tube 721a and the left rear outer tube 722a together.

The left lower coupling member 724 couples the left front inner tube 721b and the left rear inner tube 722b together.

The left through hole 725 is provided in the left lower coupling member 724. The left through hole 725 rotatably supports a left wheel axle 311 of the left front wheel 31.

The left shock absorber 72 attenuates or absorbs a displacement of the left front wheel 31 relative to the linkage 5 in the up-down direction of the body frame 21. In particular, the left rear telescopic element 722 defines and functions as a left shock absorber. The left front telescopic element 721, the left upper coupling member 723 and the left lower coupling member 724 restrict the relative turning of the left rear outer tube 722a and the left rear inner tube 722b.

Figure 5:
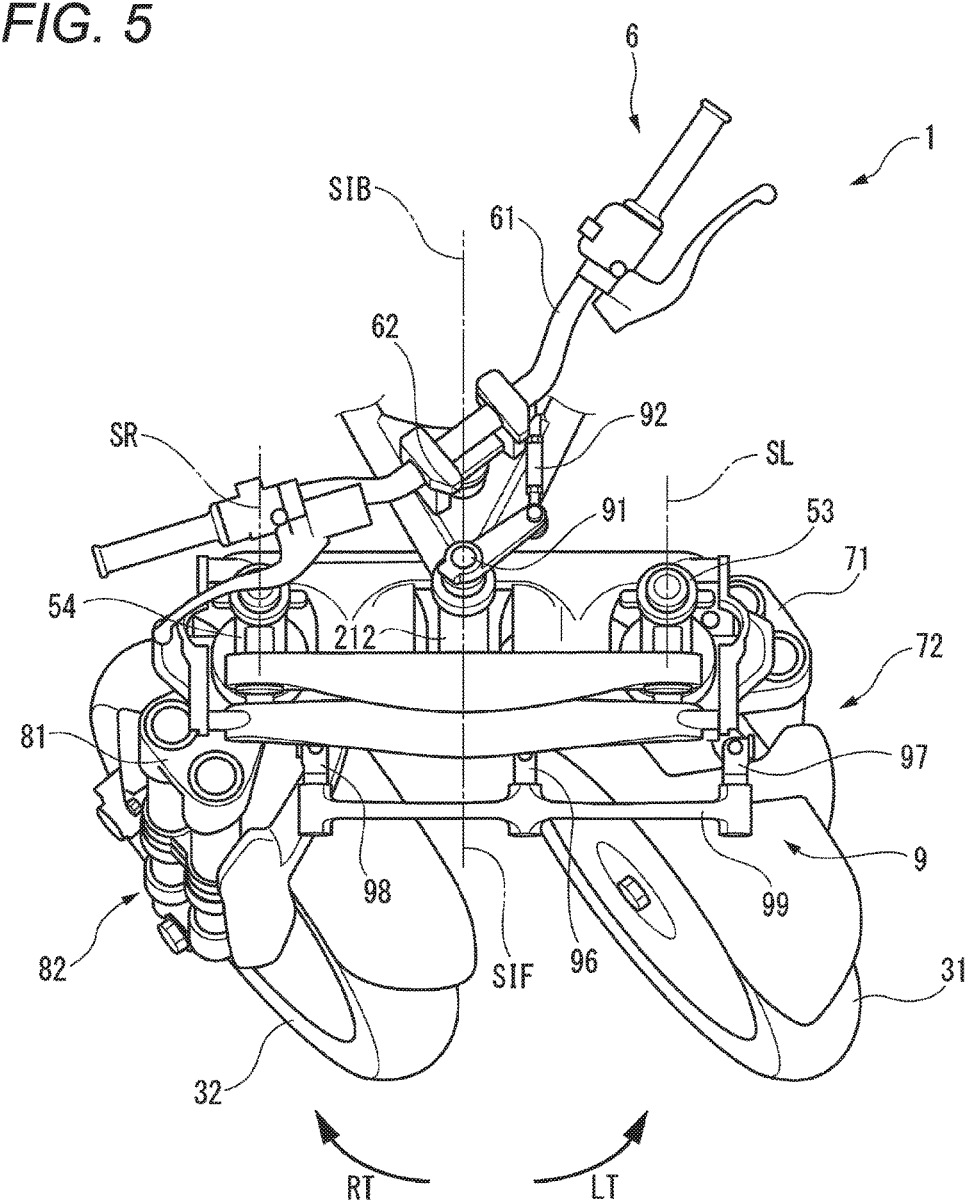
FIG. 5 is a plan view illustrating the front portion of the leaning vehicle of FIG. 1 during steering.
Figure 5:
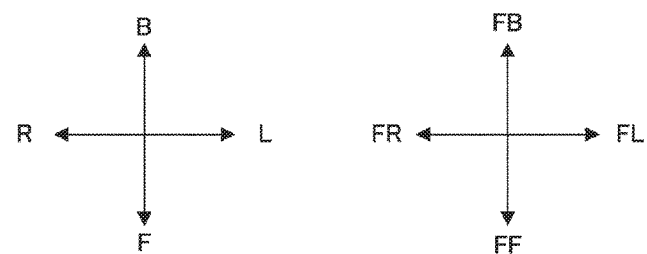

As illustrated in FIGS. 3 and 4, the leaning vehicle 1 includes a right suspension 8. The right suspension 8 includes a right bracket 81 and a right shock absorber 82. The structure of the right suspension 8 is symmetrical with that of the left suspension 7 when viewing the leaning vehicle 1 from the left thereof in the left-right direction of the body frame 21. Thus, the right suspension 8 is not illustrated separately but reference numerals are illustrated in FIGS. 2 and 5.

The right bracket 81 includes a right turnable member (not shown) at an upper portion thereof. The right turnable member is disposed in an interior portion of the right side member 54 and extends in the same direction as a direction in which the right side member 54 extends. The right side member 54 includes a right steering bearing portion (not shown). The right turnable member is supported by the right side member 54 via the right steering bearing portion. By using this structure, the right turnable member is able to turn relative to the right side member 54 about a right steering turning axis SR. Namely, the right bracket 81 is coupled with the right side member 54 so as to turn relative to the right side member 54 about the right steering turning axis SR.

The right steering turning axis SR extends in the direction in which the right side member 54 extends. As illustrated in FIG. 3, the right steering turning axis SR extends parallel to the rear intermediate steering turning axis SIB of the upstream-side steering shaft 62 in the up-down direction of the body frame 21. As illustrated in FIG. 4, the right steering turning axis SR extends parallel to the rear intermediate steering turning axis SIB of the upstream-side steering shaft 62 in the front-rear direction of the body frame 21.

The right shock absorber 82 is preferably a so-called telescopic shock absorber. As illustrated in FIG. 2, the right shock absorber 82 includes a right front telescopic element 821, a right rear telescopic element 822, a right upper bearing portion 823, a right lower bearing portion 824 and a right through hole 825.

The right front telescopic element 821 includes a right front outer tube 821a and a right front inner tube 821b. An outer diameter of the right front outer tube 821a is greater than an outer diameter of the right front inner tube 821b. The right front outer tube 821a is supported by the right bracket 81. The right front inner tube 821b is coupled with the right front outer tube 821a so as to be slidable along a right telescoping axis TR.

The right rear telescopic element 822 includes a right rear outer tube 822a and a right rear inner tube 822b. An outer diameter of the right rear outer tube 822a is greater than an outer diameter of the right rear inner tube 822b. The right rear outer tube 822a is disposed directly behind the right front outer tube 821a in the front-rear direction of the body frame 21. The right rear outer tube 822a is supported by the right bracket 81. The right rear inner tube 822b is disposed directly behind the right front inner tube 821b in the front-rear direction of the body frame 21. The right rear inner tube 822b is coupled with the right rear outer tube 822a so as to be slidable relative to the right rear outer tube 822a along the right telescoping axis TR.

The right upper bearing portion 823 couples the right front outer tube 821a and the right rear outer tube 822a together.

The right lower bearing portion 824 couples the right front inner tube 821b and the right rear inner tube 822b together.

The right through hole 825 is provided in the right lower bearing portion 824. The right through hole 825 rotatably supports a right wheel axle 321 of the right front wheel 32.

The right shock absorber 82 attenuates or absorbs a displacement of the right front wheel 32 relative to the linkage 5 in the up-down direction of the body frame 21. In particular, the right rear telescopic element 822 defines and functions as a right shock absorber. The right front telescopic element 821, the right upper bearing portion 823 and the right lower bearing portion 824 restrict the relative turning of the right rear outer tube 822a and the right rear inner tube 822b.

As illustrated in FIGS. 2 to 4, the leaning vehicle 1 includes a steering force transmission 9. The steering force transmission 9 includes a downstream-side steering shaft 91, a coupling device 92, an intermediate transmission plate 93, a left transmission plate 94, a right transmission plate 95, an intermediate joint 96, a left joint 97, a right joint 98 and a tie rod 99.

The downstream-side steering shaft 91 is supported by the link support 212 so as to turn about a front intermediate steering turning axis SIF. The front intermediate steering turning axis SIF extends parallel to the rear intermediate steering turning axis SIB which defines and functions as a turning center of the upstream-side steering shaft 62.

The coupling device 92 couples the upstream-side steering shaft 62 and the downstream-side steering shaft 91 together. The coupling device 92 is displaced as the upstream-side steering shaft 62 turns. The downstream-side steering shaft 91 turns as the coupling device 92 is so displaced. Namely, the coupling device 92 transmits a turning action of the upstream-side steering shaft 62 to the downstream-side steering shaft 91.

The link support 212 includes a front intermediate steering bearing portion (not shown). The downstream-side steering shaft 91 is supported by the link support 212 via the front intermediate steering bearing portion. The intermediate transmission plate 93 is connected to a lower portion of the downstream-side steering shaft 91. The intermediate transmission plate 93 cannot turn relative to the downstream-side steering shaft 91. Consequently, the intermediate transmission plate 93 is able to turn about the front intermediate steering turning axis SIF relative to the link support 212 together with the downstream-side steering shaft 91.

As illustrated in FIG. 3, the left transmission plate 94 is disposed directly on the left of the intermediate transmission plate 93 in the left-right direction of the body frame 21. The left transmission plate 94 is connected to the left bracket 71. The left transmission plate 94 cannot turn relative to the left bracket 71. By using this structure, the left transmission plate 94 is able to turn about the left steering turning axis SL relative to the left side member 53.

The right transmission plate 95 is disposed directly on the right of the intermediate transmission plate 93 in the left-right direction of the body frame 21. The right transmission plate 95 is connected to the right bracket 81. The right transmission plate 95 cannot turn relative to the right bracket 81. The right transmission plate 95 is able to turn about the right steering turning axis SR relative to the right side member 54.

As illustrated in FIG. 4, the intermediate joint 96 includes an intermediate joint steering bearing portion 961. The intermediate joint steering bearing portion 961 defines an intermediate joint steering turning axis SIJ that extends in the up-down direction of the body frame 21. The intermediate joint 96 is coupled to a front portion of the intermediate transmission plate 93 via the intermediate joint steering bearing portion 961. By using this structure, the intermediate joint 96 is able to turn about the intermediate joint steering turning axis SIJ relative to the intermediate transmission plate 93.

Figure 6:
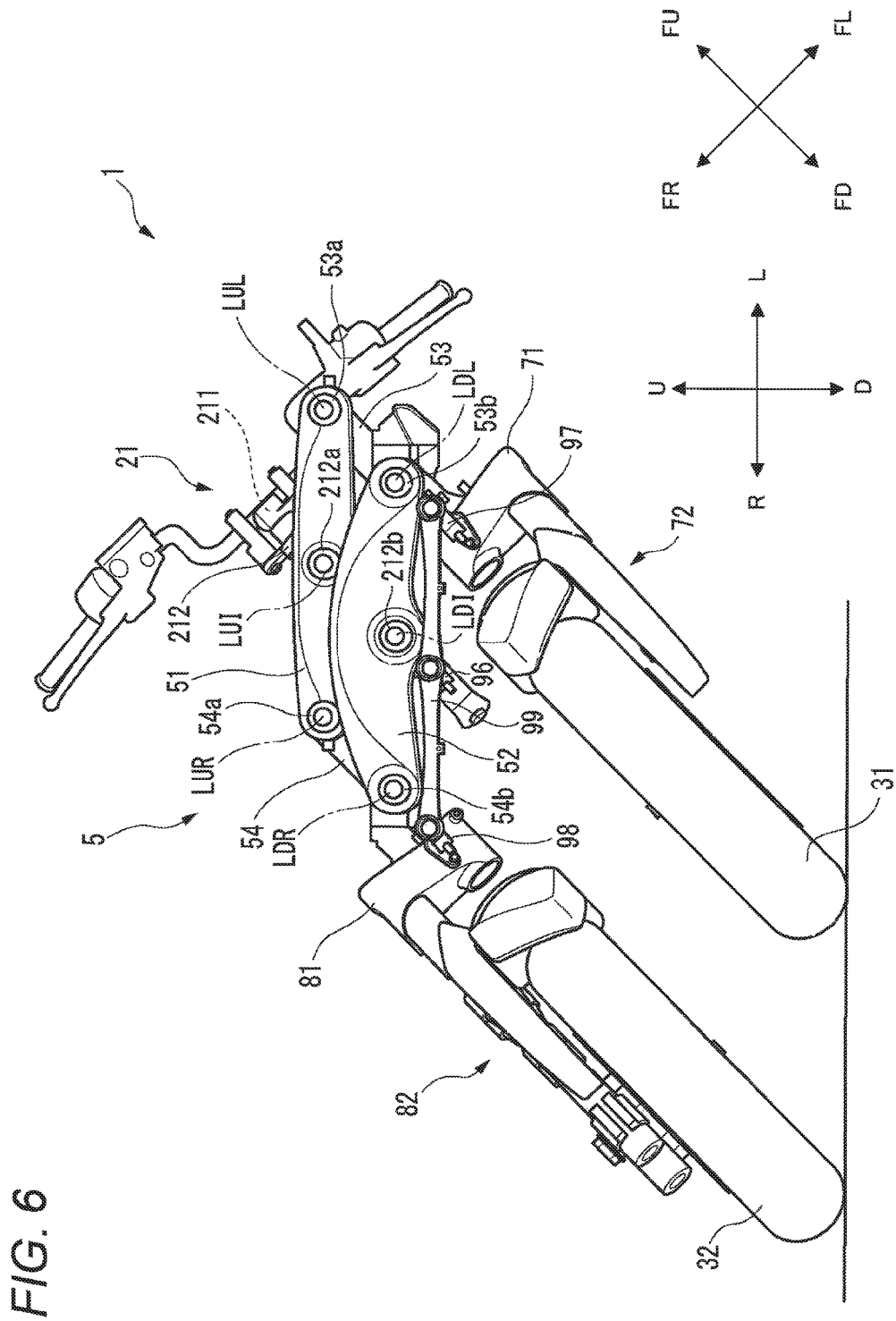
FIG. 6 is a front view illustrating the front portion of the leaning vehicle of FIG. 1 during leftward leaning.

As illustrated in FIG. 4, the left joint 97 is disposed on the left of the intermediate joint 96 in the left-right direction of the body frame 21. The left joint 97 includes a left joint steering bearing portion 971 (only its reference numeral is illustrated in FIG. 6 since its construction is similar to that of the intermediate joint 96). The left joint steering bearing portion 971 defines a left joint steering turning axis that extends in the up-down direction of the body frame 21. The left joint 97 is coupled to a front portion of the left transmission plate 94 via the left joint steering bearing portion 971. By using this structure, the left joint 97 is able to turn about the left joint steering turning axis relative to the left transmission plate 94.

As illustrated in FIG. 4, the right joint 98 is disposed on the right of the intermediate joint 96 in the left-right direction of the body frame 21. The right joint 98 includes a right joint steering bearing portion 981. The right joint steering bearing portion 981 defines a right joint steering turning axis that extends in the up-down direction of the body frame 21. The right joint 98 is coupled to a front portion of the right transmission plate 95 via the right joint steering bearing portion 981. By using this structure, the right joint 98 is able to turn about the right joint steering turning axis relative to the right transmission plate 95.

As illustrated in FIG. 3, the intermediate joint 96 includes an intermediate joint leaning bearing portion 962. The intermediate joint leaning bearing portion 962 defines an intermediate joint leaning turning axis that extends in the front- and rear direction of the body frame 21. An intermediate portion of the tie rod 99 is coupled with the intermediate joint leaning bearing portion 962 so as to be turnable about the intermediate joint leaning bearing axis.

The left joint 97 includes a left joint leaning bearing portion 972. The left joint leaning bearing portion 972 defines a left joint leaning turning axis that extends in the front-rear direction of the body frame 21. A left portion of the tie rod 99 is coupled with the left joint leaning bearing portion 972 so as to be turnable about the left joint leaning bearing axis.

The right joint 98 includes a right joint leaning bearing portion 982. The right joint leaning bearing portion 982 defines a right joint leaning turning axis that extends in the front-rear direction of the body frame 21. A right portion of the tie rod 99 is coupled with the right joint leaning bearing portion 982 so as to be turnable about the right joint leaning bearing axis.

The left transmission plate 94 is coupled with the intermediate transmission plate 93 via the left joint 97, the tie rod 99, and the intermediate joint 96. The right transmission plate 95 is coupled with the intermediate transmission plate 93 via the right joint 98, the tie rod 99 and the intermediate joint 96. The left transmission plate 94 and the right transmission plate 95 are coupled with each other via the left joint 97, the tie rod 99 and the right joint 98. In other words, the tie rod 99 couples the intermediate transmission plate 93 to the left transmission plate 94 and the right transmission plate 95.

Next, referring to FIG. 5, a steering operation of the leaning vehicle 1 will be described. FIG. 5 is a plan view of the front portion of the leaning vehicle 1, with the left front wheel 31 and the right front wheel 32 thereof turned to the left, when the front portion of the leaning vehicle 1 is viewed from above in the up-down direction of the body frame 21. In FIG. 5, the front cover 221 is omitted from illustration.

When the rider operates the handlebar 61, the upstream-side steering shaft 62 turns about the rear intermediate steering turning axis SIB relative to the head pipe 211. The turning action of the upstream-side steering shaft 62 is transmitted to the downstream-side steering shaft 91 via the coupling device 92. By using this structure, the downstream-side steering shaft 91 turns about the front intermediate steering turning axis SIF relative to the link support 212. In the case of the front left and right front wheels being turned to the left as illustrated in FIG. 5, the downstream-side steering shaft 91 turns in a direction indicated by an arrow LT. As the downstream-side steering shaft 91 turns, the intermediate transmission plate 93 turns in the direction indicated by the arrow LT about the front intermediate steering turning axis SIF relative to the link support 212.

As the intermediate transmission plate 93 turns in the direction indicated by the arrow LT, the intermediate joint 96 turns relative to the intermediate transmission plate 93 in a direction indicated by an arrow RT. This causes the tie rod 99 to move to the left in the left-right direction of the body frame 21 and to the rear in the front-rear direction of the body frame 21 while maintaining its posture.

As the tie rod 99 moves, the left joint 97 and the right joint 98 turn in the direction indicated by the arrow RT relative to the left transmission plate 94 and the right transmission plate 95, respectively. This causes the left transmission plate 94 and the right transmission plate 95 to turn in the direction indicated by the arrow LT with the tie rod 99 maintaining its posture unchanged.

When the left transmission plate 94 turns in the direction indicated by the arrow LT, the left bracket 71, which is not allowed to turn relative to the left transmission plate 94, turns in the direction indicated by the arrow LT about the left steering turning axis SL relative to the left side member 53.

When the right transmission plate 95 turns in the direction indicated by the arrow LT, the right bracket 81, which is not allowed to turn relative to the right transmission plate 95, turns in the direction indicated by the arrow LT about the right steering turning axis SR relative to the right side member 54.

When the left bracket 71 turns in the direction indicated by the arrow LT, the left shock absorber 72, which is supported on the left bracket 71, turns in the direction indicated by the arrow LT about the left steering turning axis SL relative to the left side member 53. When the left shock absorber 72 turns in the direction indicated by the arrow LT, the left front wheel 31, which is supported on the left shock absorber 72, turns in the direction indicated by the arrow LT about the left steering turning axis SL relative to the left side member 53.

When the right bracket 81 turns in the direction indicated by the arrow LT, the right shock absorber 82, which is supported on the right bracket 81, turns in the direction indicated by the arrow LT about the right steering turning axis SR relative to the right side member 54. When the right shock absorber 82 turns in the direction indicated by the arrow LT, the right front wheel 32, which is supported on the right shock absorber 82, turns in the direction indicated by the arrow LT about the right steering turning axis SR relative to the right side member 54.

When the rider operates the handlebar 61 so as to turn the left and right front wheels to the right, the elements described above turn in opposite directions to the directions in which they turn when the left and right front wheels turn to the left. Since the elements merely move oppositely in relation to the left-right direction, a detailed description of the opposite movement of the elements will be omitted here.

Thus, as has been described heretofore, the steering member 6 transmits the steering force to the left front wheel 31 and the right front wheel 32 according to the operation of the handlebar 61 by the rider. The left front wheel 31 and the right front wheel 32 turn about the left steering turning axis SL and the right steering turning axis SR, respectively, in the direction corresponding to the direction in which the handlebar 61 is operated by the rider.

Next, referring to FIGS. 3 and 6, a leaning action of the leaning vehicle 1 will be described. FIG. 6 is a front view of the front portion of the leaning vehicle 1 when the leaning vehicle 1 is viewed from the front in the front-rear direction of the body frame 21, illustrating a state where the body frame 21 is caused to lean to the left of the leaning vehicle 1. In FIG. 6, the front cover 221 is omitted from illustration.

As illustrated in FIG. 3, when the leaning vehicle 1 is viewed from the front of the body frame 21 which is standing upright, the linkage 5 exhibits the shape of a rectangle. As illustrated in FIG. 6, when the leaning vehicle 1 is viewed from the front of the body frame 21 which is leaning, the linkage 5 exhibits the shape of a parallelogram. An operation of the linkage 5 is associated with a leaning of the body frame 21 in the left-right direction. The "operation of the linkage 5" means that the shape of the linkage 5 changes as a result of the upper cross member 51 and the lower cross member 52 turning relative to the link support 212 about the upper intermediate leaning turning axis LUI and the lower intermediate leaning turning axis LDI, respectively, and the upper cross member 51, the lower cross member 52, the left side member 53, and the right side member 54 turning relatively about the upper left leaning turning axis LUL, the upper right leaning turning axis LUR, the lower left leaning turning axis LDL and the lower right leaning turning axis LDR, respectively.

For example, as illustrated in FIG. 6, when the rider causes the leaning vehicle 1 to lean to the left, the head pipe 211 and the link support 212 lean to the left from the vertical direction. As the head pipe 211 and the link support 212 lean, the upper cross member 51 turns counterclockwise about the upper intermediate leaning turning axis LUI that passes through the upper intermediate leaning bearing portion 212a relative to the link support 212 when viewed from the front of the leaning vehicle 1. Similarly, the lower cross member 52 turns counterclockwise about the lower intermediate leaning turning axis LDI that passes through the lower intermediate leaning bearing portion 212b relative to the head pipe 211 when viewed from the front of the leaning vehicle 1. This causes the upper cross member 51 to move to the left in the left-right direction of the body frame 21 relative to the lower cross member 52.

As a result of the upper cross member 51 moving in the manner described above, the upper cross member 51 turns counterclockwise about the upper left leaning turning axis LUL that passes the upper left leaning bearing portion 53a and the upper right leaning turning axis LUR that passes through the upper right leaning bearing portion 54a relative to the left side member 53 and the right side member 54, respectively, when viewed from the front of the leaning vehicle 1. Similarly, the lower cross member 52 turns counterclockwise about the lower left leaning turning axis LDL that passes the lower left leaning bearing portion 53b and the lower right leaning turning axis LDR that passes through the lower right leaning bearing portion 54b relative to the left side member 53 and the right side member 54, respectively, when viewed from the front of the leaning vehicle 1. As a result of the lower cross member 52 moving in the manner described above, the left side member 53 and the right side member 54 lean to the left of the leaning vehicle 1 from the vertical direction while maintaining their postures that are parallel to the head pipe 211 and the link support 212.

As this occurs, the lower cross member 52 moves to the left in the left-right direction of the body frame 21 relative to the tie rod 99. As a result of the lower cross member 52 moving in the manner described above, the tie rod 99 turns relative to the intermediate joint 96, the left joint 97, and the right joint 98 about the intermediate joint leaning bearing portion, the left joint leaning bearing portion, and the right joint leaning bearing portion, respectively. This allows the tie rod 99 to maintain a posture that is parallel to the upper cross member 51 and the lower cross member 52.

As the left side member 53 leans to the left of the leaning vehicle 1, the left bracket 71 that is supported on the left side member 53 via the left turnable member leans to the left of the leaning vehicle 1. As the left bracket 71 leans in this manner, the left shock absorber 72 that is supported on the left bracket 71 also leans to the left of the leaning vehicle 1. As a result of the left shock absorber 72 leaning in the manner described above, the left front wheel 31 that is supported on the left shock absorber 72 leans to the left of the leaning vehicle 1 while maintaining its posture that is parallel to the head pipe 211 and the link support 212.

As the right side member 54 leans to the left of the leaning vehicle 1, the right bracket 81 that is supported on the right side member 54 via the right turnable member leans to the left of the leaning vehicle 1. As the right bracket 81 leans in this way, the right shock absorber 82 that is supported on the right bracket 81 also leans to the left of the leaning vehicle 1. As a result of the right shock absorber 82 leaning in the manner described above, the right front wheel 32 that is supported on the right shock absorber 82 leans to the left of the leaning vehicle 1 while maintaining its posture that is parallel to the head pipe 211 and the link support 212.

The leaning actions of the left front wheel 31 and the right front wheel 32 are described based on the vertical direction. However, when the leaning vehicle 1 leans (when the linkage 5 is operated), the up-down direction of the body frame 21 does not coincide with the vertical direction. When the up-down direction of the body frame 21 is taken as the reference, when the linkage 5 is operated, the left front wheel 31 and the right front wheel 32 change their relative position in the up-down direction of the body frame 21. In other words, the linkage 5 changes the relative position of the left front wheel 31 and the right front wheel 32 in the up-down direction of the body frame 21 to cause the body frame 21 to lean to the left or right of the leaning vehicle 1 from the vertical direction. Accordingly, the leaning vehicle 1 turns leftward.

When the rider causes the leaning vehicle 1 to lean to the right, the elements lean to the right. Accordingly, the leaning vehicle 1 turns rightward. Since the elements merely move oppositely in relation to the left-right direction, a detailed description of the opposite movement of the elements will be omitted here.

Figure 7:
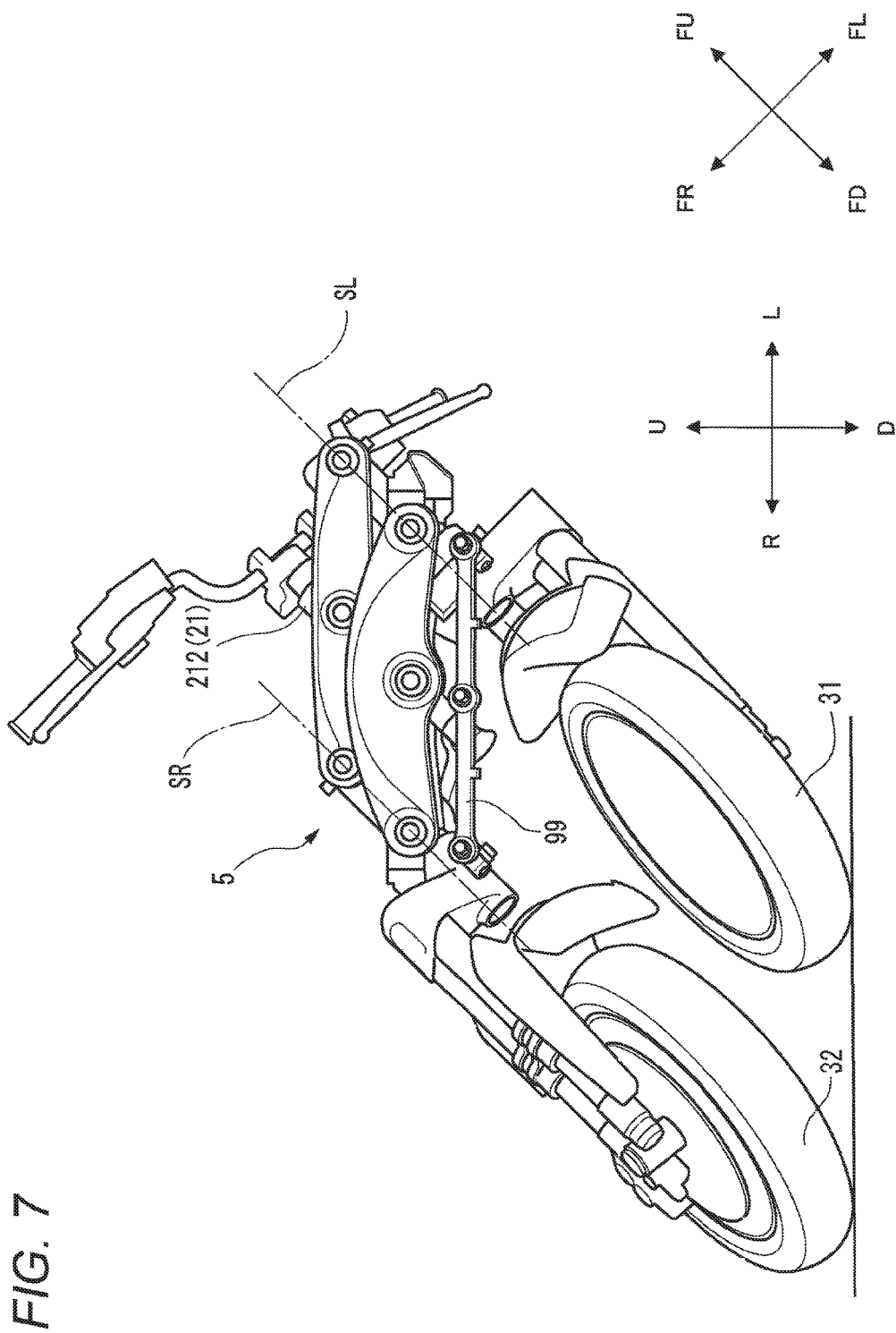
FIG. 7 is a front view illustrating the front portion of the leaning vehicle of FIG. 1 during steering and leftward leaning.

FIG. 7 is a front view of the front portion of the leaning vehicle 1 when the leaning vehicle 1 is viewed from the front in the front-rear direction of the body frame 21, which shows a state in which the leaning vehicle 1 is caused to lean while the front wheels thereof are being turned. FIG. 7 shows a state in which the front wheels are turned to the left while the leaning vehicle 1 is leaning to the left. In FIG. 7, the front cover 221 is omitted from illustration.

When the front wheels are turned, the left front wheel 31 is turned counterclockwise about the left steering turning axis SL, while the right front wheel 32 is turned counterclockwise about the right steering turning axis SR. When the rider causes the leaning vehicle 1 to lean, the left front wheel 31 and the right front wheel 32 lean to the left of the leaning vehicle 1 together with the body frame 21. Namely, in this state, the linkage 5 exhibits the shape of a parallelogram. The tie rod 99 moves to the left in the left-right direction of the body frame 21 and to the rear in the front-rear direction of the body frame 21 from the position that the tie rod 99 takes when the body frame 21 is standing upright.

Figure 8:
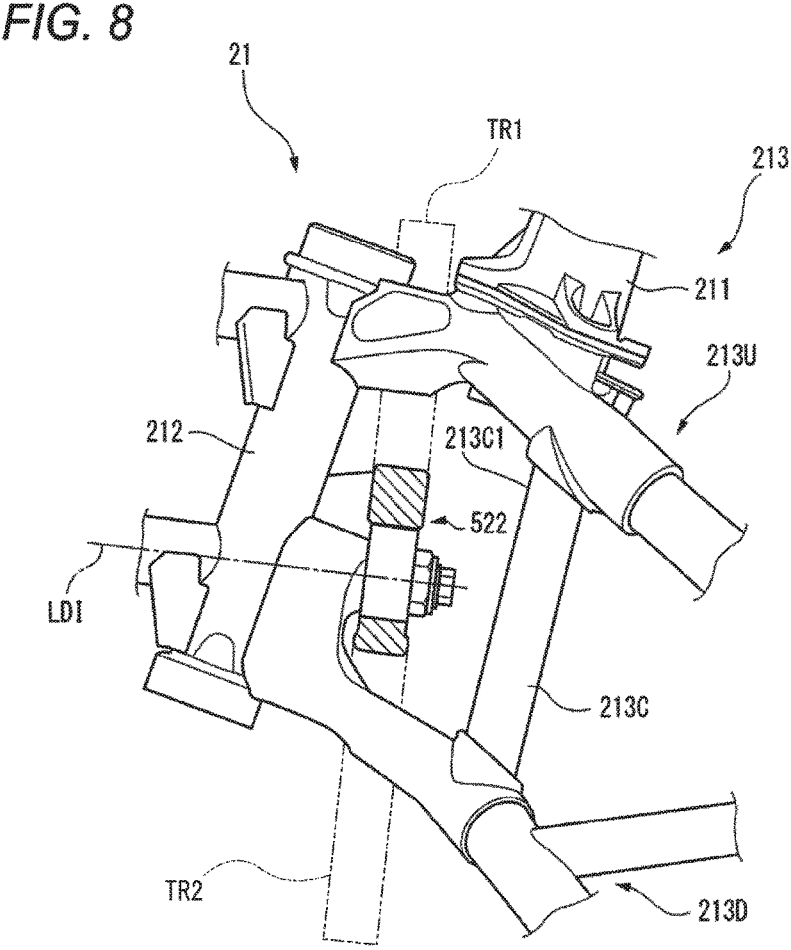
FIG. 8 is a left side view illustrating the front portion of the leaning vehicle of FIG. 1 with a portion of the front portion illustrated in section.
Figure 8:
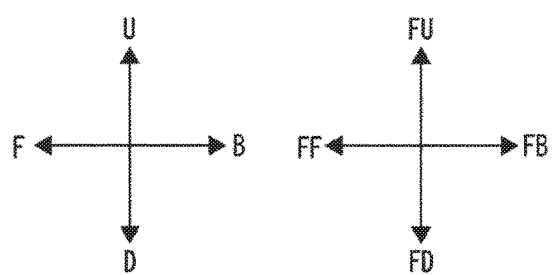

FIG. 8 is a left side view of a front portion of the leaning vehicle 1 in which the vehicle body frame 21 stands upright with a portion of the front portion illustrated in section. Specifically, FIG. 8 is a left side view of the front portion of the leaning vehicle 1 when the leaning vehicle 1 is viewed from the left in the left-right direction of the vehicle body frame 21. In the leaning vehicle 1 according to the present preferred embodiment, the main frame 213 includes an upper frame 213U, a lower frame 213D and a coupling frame 213C.

The dashed chain lines TR1 represent a turning range of a portion of the rear element 522 of the lower cross member 52 located on the right of the lower intermediate leaning turning axis LDI when the leaning vehicle 1 leans rightward. Although it is not shown, a turning range of a portion of the rear element 522 of the lower cross member 52 located on the left of the lower intermediate leaning turning axis LDI when the leaning vehicle 1 leans leftward is symmetrical with the turning range TR1 relative to the link support 212. The upper frame 213U extends rearward from the link support 212 in the front-rear direction of the vehicle body frame 21 so as to intersect an area located directly above a turning range of the rear element 522 of the lower cross member 52 that is centered at a lower intermediate leaning turning axis LDI.

The dashed chain lines TR2 represent a turning range of the portion of the rear element 522 of the lower cross member 52 located on the right of the lower intermediate leaning turning axis LDI when the leaning vehicle 1 leans leftward. Although it is not shown, a turning range of the portion of the rear element 522 of the lower cross member 52 located on the left of the lower intermediate leaning turning axis LDI when the leaning vehicle 1 leans rightward is symmetrical with the turning range TR2 relative to the link support 212. The lower frame 213D extends rearward from the link support 212 in the front-rear direction of the vehicle body frame 21 so as to intersect an area located directly below the turning range of the rear element 522 of the lower cross member 52 that is centered at the lower intermediate leaning turning axis LDI.

The coupling frame 213C extends such that the longitudinal direction thereof corresponds to the up-down direction of the vehicle body frame 21. The coupling frame 213C couples the upper frame 213U and the lower frame 213D together at an area located behind the rear element 522 of the lower cross member 52 in the front-rear direction of the vehicle body frame 21. A majority of a front edge 213C1 of the coupling frame 213C extends along the longitudinal direction of the coupling frame 213C.

The inventors conceived that the frame structure surrounding the rear element 522 of the lower cross member 52 is able to be reduced in size by using the coupling frame 213C to couple the upper frame 213U and the lower frame 213D together such that the longitudinal direction thereof corresponds to the up-down direction of the vehicle body frame 21, thus allowing the coupling frame 213U to be located closer to the rear element 522 of the lower cross member 52. Reducing the size of the frame structure makes it possible not only to prevent an enlargement in size of the vehicle body frame 21 but also to enhance the rigidity of the frame structure. The inventors also discovered that such frame structure solves a specific problem to the leaning vehicle 1 that includes the two front wheels 3 aligned side by side in the left-right direction of the vehicle body frame 21.

In the leaning vehicle 1 that includes the two front wheels 3 described above, there is a situation in which a force acting on the left front wheel 31 differs from a force acting on the right front wheel 32. For example, the situation described above may occur when the condition of a road surface with which the left front wheel 31 is in contact differs from the condition of a road surface with which the right front wheel 32 is in contact.

For example, in the case where a resisting force acting on the right front wheel 32 is greater than a resisting force acting on the left front wheel 31, a force that is inputted into a right portion of the lower cross member 52 by way of the right suspension 8 and a lower portion of the right side member 54 becomes greater than a force that is inputted into a left portion of the lower cross member 52 by way of the left suspension 7 and a lower portion of the left side member 53. As a result, a clockwise force acts on the lower cross member 52 when the leaning vehicle 1 is viewed from above in the up-down direction of the vehicle body frame 21.

On the other hand, due to the reaction, a force that is inputted into a left portion of the upper cross member 51 by way of an upper portion of the left side member 53 becomes greater than a force that is inputted into a right portion of the upper cross member 51 by way of an upper portion of the right side member 54. As a result, a counterclockwise force acts on the upper cross member 51 when the leaning vehicle 1 is viewed from above in the up-down direction of the vehicle body frame 21.

Namely, the clockwise force acts on a lower portion of the link support 212 that supports the lower cross member 52 when the leaning vehicle 1 is viewed from above in the up-down direction of the vehicle body frame 21, and the counterclockwise force acts on the upper portion of the link support 212 that supports the upper cross member when the leaning vehicle 1 is viewed from above in the up-down direction of the vehicle body frame 21. As a result, a torsional force acts on the link support 212.

This torsional force acts on the upper frame 213U that extends rearward from the link support 212 as a counterclockwise force acting about the link support 212 when the leaning vehicle 1 is viewed from above in the up-down direction of the vehicle body frame 21. On the other hand, the torsional force acts on the lower frame 213D that extends rearward from the link support 212 as a clockwise force acting about the link support 212 when the leaning vehicle 1 is viewed from above in the up-down direction of the vehicle body frame 21.

The inventors discovered that a deflection of the upper frame 213U and the down frame 213D that would be caused by the torsional force described above is able to be prevented or significantly reduced by coupling the upper frame 213U and the lower frame 213D together with the coupling frame 213C that extends such that the longitudinal direction thereof corresponds to the up-down direction of the vehicle body frame 21. The amount of deflection that would be caused in the upper frame 213U and the lower frame 213D by the torsional force when no countermeasure is taken becomes greater as the upper frame 213U and the down frame 213D extend farther away from the link support 212. Consequently, a structure that prevents or significantly reduces the deflection is provided desirably in a position located as close to the link support 212 as possible.

According to the structure described above, a majority of the front edge 213C1 of the coupling frame 213C that follows the longitudinal direction thereof extends in the up-down direction of the vehicle body frame 21. Therefore, the coupling frame 213C is disposed close to the rear element 522 of the lower cross member 52. Thus, not only the frame structure surrounding the rear element 522 is smaller in size but also a deflection is prevented or significantly reduced that would be generated in the upper frame 213U and the down frame 213D by the torsional force that acts on the link support 212. As a result, the rigidity of the frame structure is also enhanced.

Thus, it is possible not only to prevent the enlargement in size of the vehicle body frame 21 while meeting the demand to increase the bank angle of the leaning vehicle 1 that includes the leanable vehicle body frame 21 and the two front wheels 3 but also to enhance the rigidity of the vehicle body frame 21 against the torsional force that acts on the link support 212 that is specific to the leaning vehicle 1 as described above.

Figure 9:
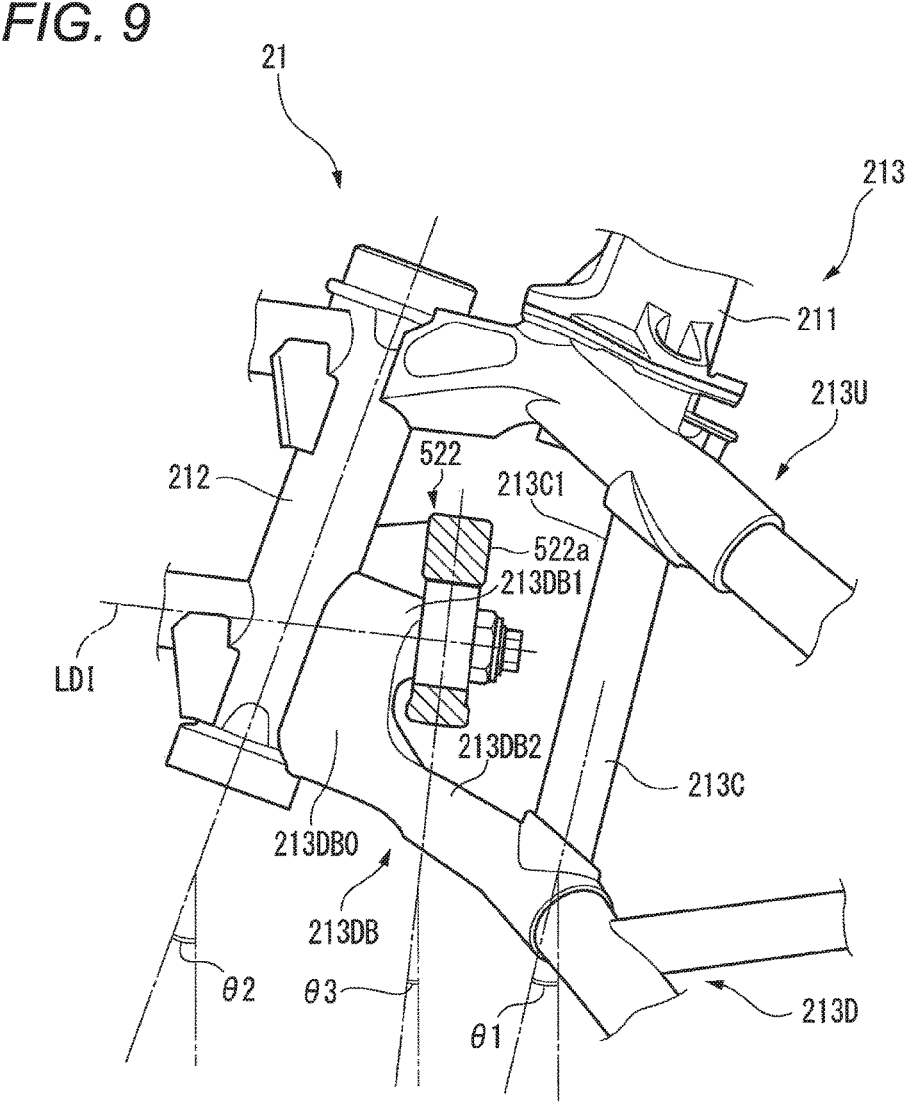
FIG. 9 is a left side view illustrating the front portion of the leaning vehicle of FIG. 1 with a portion of the front portion illustrated in section.
Figure 9:
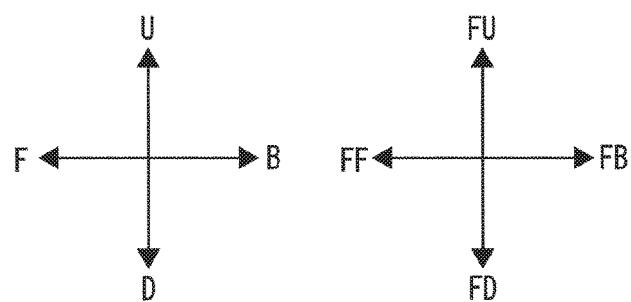

As shown in FIG. 9, the front edge 213C1 of the coupling frame 213C directly faces a rear surface 522a of the rear element 522 of the lower cross member 52. The rear surface 522a is a surface that is oriented rearward in the front-rear direction of the vehicle body frame 21. In other words, no other member exists between the front edge 213C1 of the coupling frame 213C and the rear surface 522a of the rear element 522.

According to this structure, it is easy to satisfy the requirement to dispose the coupling frame 213C close to the rear element 522 of the lower cross member 52.

In FIG. 9, an angle 61 denotes an angle that is defined by the longitudinal direction of the coupling frame 213C and the up-down direction of the vehicle body frame 21 when the vehicle body frame 21 standing upright is viewed from the left-right direction thereof. An angle 62 denotes an angle that is defined by a longitudinal direction of the link support 212 and the up-down direction of the vehicle body frame 21 when the vehicle body frame 21 standing upright is viewed from the left-right direction thereof. An angle 63 denotes an angle that is defined by a plane that intersects the lower intermediate leaning turning axis LDI at right angles and the up-down direction of the vehicle body frame 21 when the vehicle body frame 21 standing upright is viewed from the left-right direction thereof. In the leaning vehicle 1 according to the present preferred embodiment, the angle 61 preferably has a value between the values of the angle 62 and the angle 63, for example.

According to this structure, it is easy to satisfy the requirement to dispose the coupling frame 213C close to the link support 212 while preventing interference with the rear element 522 of the lower cross member 52 that turns about the lower intermediate leaning turning axis LDI.

More specifically, the value of the angle 61 is preferably smaller than the value of the angle 62, for example.

In order to significantly reduce or minimize the turning angle of the linkage 5 due to a change in the road surface condition at the ground contact points of the front wheels 3, the angle 63 may be zero or a value that is as close to zero as possible, whereas the angle 62 that generally corresponds to a caster angle needs to have a greater value than zero to provide a desirable running characteristic of the leaning vehicle 1. To enhance the rigidity of the frame structure in these situations, an upper end of the coupling frame 213C should be disposed close to the link support 212 while preventing interference of a lower end of the coupling frame 213C with the rear element 522 of the lower cross member 52. As a result, the direction in which the coupling frame 213C extends is located close to the up-down direction of the vehicle body frame 21, and the value of the angle θ1 becomes smaller than the value of the angle θ2. This provides a desired caster angle that is compatible with the rigidity of the frame structure.

As shown in FIG. 9, the lower frame 213D includes a lower branch member 213DB. The lower branch member 213DB includes a lower proximal end 213DB0, a first branch 213DB1 and a second branch 213DB2.

The lower proximal end 213DB0 is connected to the link support 212. The first branch 213DB1 and the second branch 213DB2 branch from the lower proximal end 213DB0.

The first branch 213DB1 is situated above the second branch 213DB2 in the up-down direction of the vehicle body frame 21. The first branch 213DB1 supports the rear element 522 of the lower cross member 52.

The second branch 213DB2 is situated below the first branch 213DB1 in the up-down direction of the vehicle body frame 21. A lower end of the coupling frame 213C is connected to the second branch 213DB2.

The lower branch member 213DB having such a shape is able to be manufactured through, for example, a lost wax process.

As has been described above, it is desirable that the structure to prevent or significantly reduce the distortion generated in the upper frame 213U and the lower frame 213D by the torsional force acting on the link support 212 is provided in the position located as close to the link support 212 as possible. According to the structure described above, it is easy to satisfy the requirement to dispose the coupling frame 213C close to the link support 212.

Figure 10:
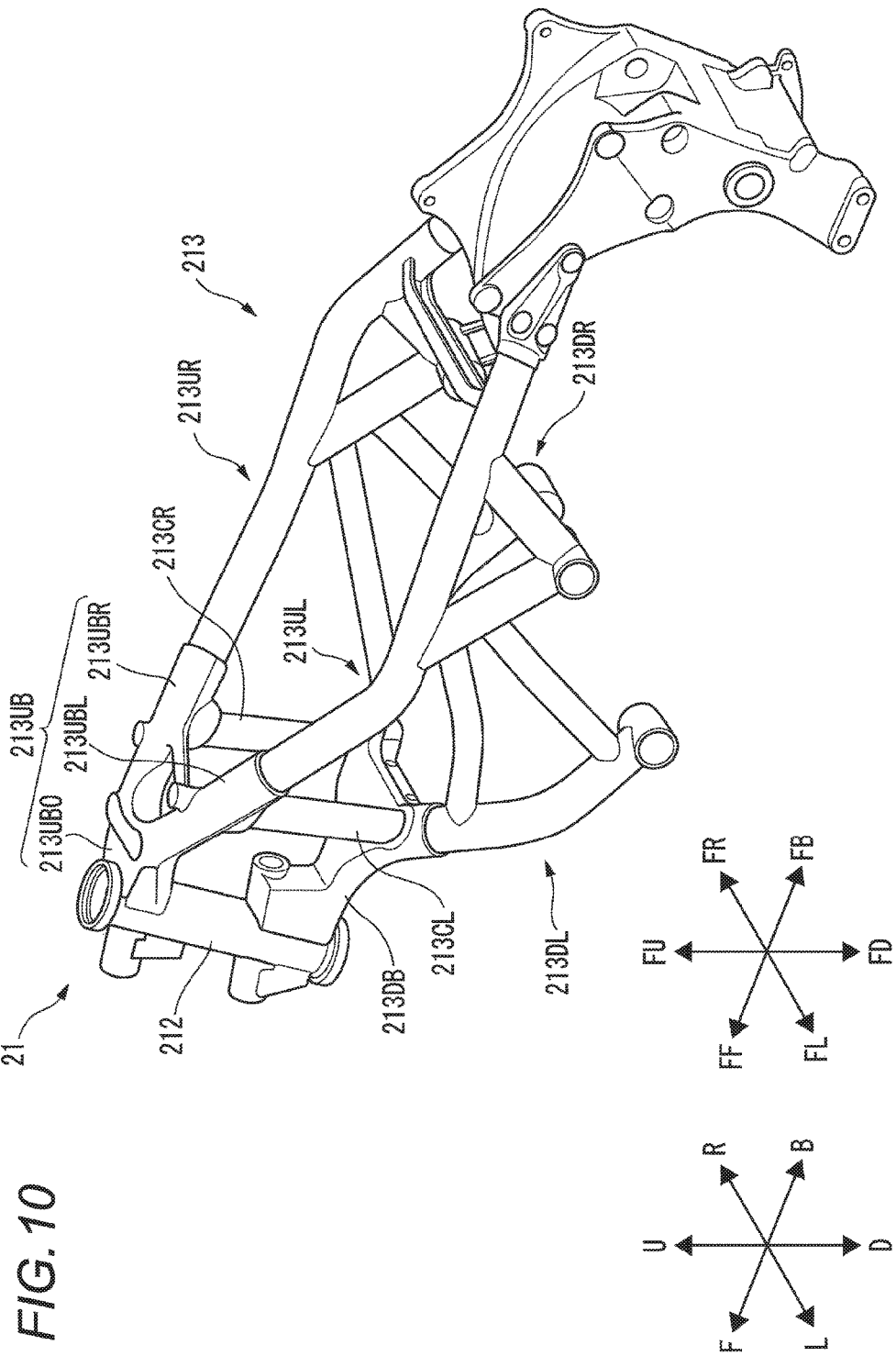
FIG. 10 is a perspective view illustrating a portion of the leaning vehicle of FIG. 1.
Figure 11:
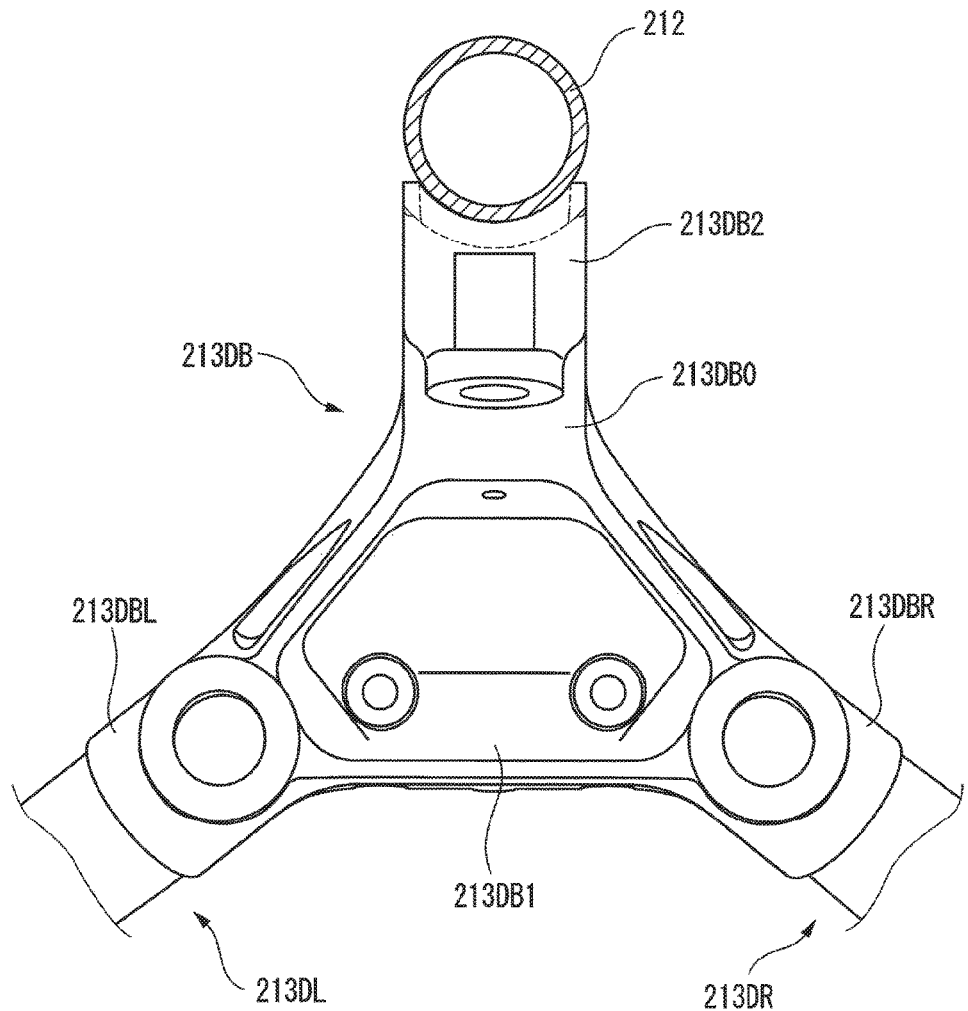
FIG. 11 is a plan view illustrating a portion of the leaning vehicle of FIG. 1.
Figure 11:
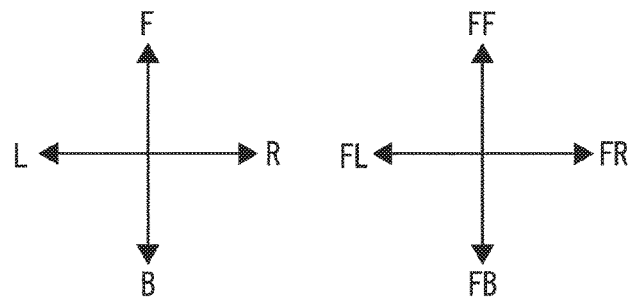

FIG. 10 shows an external appearance of the vehicle body frame 21 as viewed from a left upper rear position. FIG. 11 shows an external appearance of the lower branch member 213DB as viewed from above in the up-down direction of the vehicle body frame 21.

The upper frame 213U includes a left upper frame 213UL and a right upper frame 213UR. The lower frame 213D includes a left lower frame 213DL and a right lower frame 213DR.

The left upper frame 213UL extends from the link support 212 rearward in the left-right direction of the vehicle body frame 21 and rearward in the front-rear direction of the vehicle body frame 21. The right upper frame 213UR extends from the link support 212 rightward in the left-right direction of the vehicle body frame 21 and rearward in the front-rear direction of the vehicle body frame 21.

The left lower frame 213DL extends from the link support 212 leftward in the left-right direction of the vehicle body frame 21 and rearward in the front-rear direction of the vehicle body frame 21. The right lower frame 213DR extends from the link support 212 rightward in the left-right direction of the vehicle body frame 21 and rearward in the front-rear direction of the vehicle body frame 21.

The coupling frame 213C includes a left coupling frame 213CL and a right coupling frame 213CR. The left coupling frame 213CL couples the left upper frame 213UL and the left lower frame 213DL together. The right coupling frame 213CR couples the right upper frame 213UR and the right lower frame 213DR together.

For example, in the case where a counterclockwise force acts on an upper portion of the link support 212 surrounding the upper cross member 51 when the leaning vehicle 1 is viewed from above in the up-down direction of the vehicle body frame 21, a compressive force acts on the left upper frame 213UL, whereas a tensile force acts on the right upper frame 213UR. Consequently, stress generated in the upper portion of the link support 212 is respectively transformed by the left upper frame 213UL and the right upper frame 213UR into differently-directed forces to be absorbed. As a result, it is possible to enhance the rigidity of the upper frame 213U.

Similarly, in the case where a clockwise force acts on a lower portion of the link support 212 supporting the lower cross member 52 when the leaning vehicle 1 is viewed from above in the up-down direction of the vehicle body frame 21, a tensile force acts on the left lower frame 213DL, whereas a compressive force acts on the right lower frame 213DR. Consequently, stress generated in the lower portion of the link support 212 is respectively transformed by the left lower frame 213DL and the right lower frame 213DR into differently-directed forces to be absorbed. As a result, it is possible to enhance the rigidity of the lower frame 213D.

On the other hand, the differently-directed forces act on the left upper frame 213UL and the left lower frame 213DL, thus generating a force that distorts both the left upper frame 213UL and the left lower frame 213DL in the front-rear direction of the vehicle body frame 21. However, since the left upper frame 213UL and the left lower frame 213DL are coupled together with the left coupling frame 213CL, it is possible to prevent or significantly reduce the distortion that would be generated by the torsional force. As a result, it is possible to enhance the rigidity of a frame structure that is defined by a portion of the link support 212, a portion of the left upper frame 213UL, a portion of the left lower frame 213DL and the left coupling frame 213CL.

Similarly, the differently-directed forces also act on the right upper frame 213RL and the right lower frame 213DRL, thus generating a force that distorts both the right upper frame 213UR and the right lower frame 213DR in the front-rear direction of the vehicle body frame 21. However, since the right upper frame 213UR and the right lower frame 213DR are coupled together with the right coupling frame 213CR, it is possible to prevent or significantly reduce the distortion that would be generated by the torsional force. As a result, it is possible to enhance the rigidity of a frame structure that is defined by a portion of the link support 212, a portion of the right upper frame 213UR, a portion of the right lower frame 213DR and the right coupling frame 213CR.

As shown in FIG. 10, the upper frame 213U includes an upper branch member 213UB. The upper branch member 213UB includes an upper proximal end 213UB0, a left upper branch 213UBL and a right upper branch 213UBR.

The upper proximal end 213UB0 is connected to the link support 212. The left upper branch 213UBL and the right upper branch 213UBR branch from the upper proximal end 213UB0.

The left upper branch 213UBL is situated on the left of the right upper branch 213UBR in the left-right direction of the vehicle body frame 21. The left upper branch 213UBL defines a portion of the left upper frame 213UL.

The right upper branch 213UBR is situated on the right of the left upper branch 213UBL in the left-right direction of the vehicle body frame 21. The right upper branch 213UBR defines a portion of the right upper frame 213UR.

The upper branch member 213UB having such a shape is able to be manufactured through, for example, a lost wax process.

As has been described above, the lower frame 213D includes the lower branch member 213DB. As shown in FIG. 11, the lower branch member 213DB includes a left lower branch 213DBL and a right lower branch 213DBR. The left lower branch 213DBL and the right lower branch 213DBR branch from the lower proximal end 213DB0.

The left lower branch 213DBL is situated on the left of the right lower branch 213DBR in the left-right direction of the vehicle body frame 21. The left lower branch 213DBL defines a portion of the left lower frame 213DL.

The right lower branch 213DBR is situated on the right of the left lower branch 213DBL in the left-right direction of the vehicle body frame 21. The right lower branch 213DBR defines a portion of the right lower frame 213DR.

The lower branch member 213DB having such a shape is able to be manufactured through, for example, a lost wax process.

The left coupling frame 213CL couples the left upper branch 213UBL and the left lower branch 213DBL together.

The right coupling frame 213CR couples the right upper branch 213UBR and the right lower branch 213DBR together.

As has been described above, it is desirable that the structure to prevent or significantly reduce the distortion generated in the upper frame 213U and the lower frame 213D by the torsional force acting on the link support 212 is provided in the position located as close to the link support 212 as possible. According to the structure described above, it is easy to satisfy the requirement to dispose the left coupling frame 213CL and the right coupling frame 213CR close to the link support 212.

The preferred embodiments described heretofore are intended to facilitate the understanding of the disclosed concepts and are not intended to limit the disclosed concepts. The disclosed contents can be modified or improved without departing from the disclosed concepts.

In the preferred embodiments described above, the upper cross member 51 preferably includes a single plate-shaped member, while the lower cross member 52 preferably includes the front element 521 and the rear element 522. Additionally or alternatively, the upper cross member 51 may include a front element and a rear element. In this case, at least one of the features described above with reference to the rear element 522 of the lower cross member 52 and the coupling frame 213C can be applied to the rear element of the upper cross member 51.

The linkage 5 may include a cross member other than the upper cross member 51 and the lower cross member 52. The "upper cross member" and the "lower cross member" are merely so called based on their relative positional relationship in relation to the up-down direction. The "upper cross member" does not mean an uppermost cross member in the linkage 5. The "upper cross member" refers to a cross member that is located above another cross member. The "lower cross member" does not mean a lowermost cross member in the linkage 5. The "lower cross member" refers to a cross member that is located below another cross member.

In the preferred embodiments described above, the leaning vehicle 1 preferably includes the single rear wheel 4. However, the leaning vehicle 1 may include a plurality of rear wheels.

In the preferred embodiments described above, the handlebar 61 preferably includes the single member that extends in the left-right direction of the body frame. However, the handlebar 61 may include individual members including a left handlebar portion operated by the left hand of the rider and a right handlebar portion operated by the right hand of the rider, provided that a steering force to turn the left front wheel 31 and the right front wheel 32 is able to be inputted through the handlebar 61.

The terms and expressions that are used in this description are used to describe the preferred embodiments of the disclosed concepts and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are comprised therein. When used in this description to depict directions and members, the expression reading "along a certain direction" means that a case where something inclines at an angle falling within the range of ±40 degrees relative to the certain direction is included therein. When used in this description, the expression reading "something extends in a certain direction" means that a case where something extends while being inclined at an angle falling within the range of ±40 degrees relative to the certain direction is included therein.

When used in this description, the expression "so as not to be movable relative to the body frame 21" means that a certain element or member is caused to lean in the left-right direction of the leaning vehicle 1 together with the body frame 21 when the body frame 21 is caused to lean in the left-right direction of the leaning vehicle 1. When used in this description, the expression "so as not to be movable relative to the body frame 21" may include not only a case where a certain element or member is directly fixed to the body frame but also a case where the certain element of member is fixed to a leaning vehicle component (a fuel tank, a bracket, the engine unit 24, etc.) which is fixed on the body frame 21. Here the term "fixed" may include a case that a certain element or member is fixed by way of a damping member or the like.

The disclosed concepts can be implemented with many different preferred embodiments. This description should be understood to provide some preferred embodiments of the disclosed concepts. The preferred embodiments which is are least described or illustrated in this description are so described or illustrated based on the understanding that the preferred embodiments are not intended to limit the disclosed concepts.

The disclosed concepts include every preferred embodiment which includes an equivalent element, a modification, a deletion, a combination (for example, a combination of characteristics of various preferred embodiments), an improvement and an alteration which can be recognized by those skilled in the art based on the preferred embodiments disclosed in this description. The limitative matters of claims should be construed broadly based on terms used in the claims and hence should not be limited by the preferred embodiments described in this specification or the prosecution of this patent application. Those preferred embodiments should be construed as non-exclusive. For example, in this description, the terms "preferable" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A leaning vehicle comprising:
a body frame that leans leftward when the leaning vehicle turns leftward in a left-right direction and leans rightward when the leaning vehicle turns rightward;
a left front wheel and a right front wheel arranged side by side in a left-right direction of the body frame;

a left suspension that supports the left front wheel;
a right suspension that supports the right front wheel; and
a linkage that changes positions of the left front wheel and the right front wheel relative to the body frame to cause the body frame to lean leftward or rightward; wherein the linkage includes:
an upper cross member;
a lower cross member disposed below the upper cross member in an up-down direction of the body frame;
a left side member disposed above the left front wheel in the up-down direction of the body frame, and that supports the left suspension turnably about a left steering axis extending in the up-down direction of the body frame; and
a right side member disposed above the right front wheel in the up-down direction of the body frame, and that supports the right suspension turnably about a right steering axis extending in the up-down direction of the body frame;
the upper cross member, the lower cross member, the left side member, and the right side member are turnably connected with one another such that the upper cross member and the lower cross member maintain postures that are parallel to each other, and such that the left side member and the right side member maintain postures that are parallel to each other;
the body frame includes a link support that supports the linkage;
at least one of the upper cross member and the lower cross member includes:
a front element turnable about a turning axis extending in a front-rear direction of the body frame at a location ahead of the link support in the front-rear direction of the body frame; and
a rear element turnable about the turning axis at a location behind the link support in the front-rear direction of the body frame;
the body frame further includes:
an upper frame extending from the link support rearward in the front-rear direction of the body frame so as to intersect an area located directly above a turning range of the rear element in the up-down direction of the body frame;
a lower frame extending from the link support rearward in the front-rear direction of the body frame so as to intersect an area located directly below the turning range of the rear element in the up-down direction of the body frame; and
a coupling frame extending in a longitudinal direction corresponding to the up-down direction of the body frame, and that couples the upper frame and the lower frame together at a location behind the link support in the front-rear direction of the body frame; and
a majority of a front edge of the coupling frame extends in the longitudinal direction as viewed from the left-right direction of the body frame when the leaning vehicle is in an upright condition.

2. The leaning vehicle according to claim 1, wherein the front edge of the coupling frame directly faces a surface of the rear element that faces rearward in the front-rear direction of the body frame.

3. The leaning vehicle according to claim 1, wherein an angle between the longitudinal direction of the coupling frame and the up-down direction of the body frame as viewed from the left-right direction of the body frame when the leaning vehicle is in the upright condition has a value that is between:
an angle between a longitudinal direction of the link support and the up-down direction of the body frame as viewed from the left-right direction of the body frame when the leaning vehicle is in the upright condition; and
an angle between a plane perpendicular to the turning axis and the up-down direction of the body frame as viewed from the left-right direction of the body frame when the leaning vehicle is in the upright condition.

4. The leaning vehicle according to claim 1, wherein an angle between the longitudinal direction of the coupling frame and the up-down direction of the body frame is smaller than an angle between a longitudinal direction of the link support and the up-down direction of the body frame, as viewed from the left-right direction of the body frame when the leaning vehicle is in the upright condition.

5. The leaning vehicle according to claim 1, wherein at least one of the upper frame and the lower frame includes a branch member including:
a proximal end connected to the link support;
a first branch branching from the proximal end and supporting the rear element; and
a second branch branching from the proximal end and connected with one end of the coupling frame.

6. The leaning vehicle according to claim 1, wherein
the upper frame includes:
a left upper frame extending from the link support leftward in the left-right direction of the body frame and rearward in the front-rear direction of the body frame; and
a right upper frame extending from the link support rightward in the left-right direction of the body frame and rearward in the front-rear direction of the body frame;
the lower frame includes:
a left lower frame extending from the link support leftward in the left-right direction of the body frame and rearward in the front-rear direction of the body frame; and
a right lower frame extending from the link support rightward in the left-right direction of the body frame and rearward in the front-rear direction of the body frame; and
the coupling frame includes:
a left coupling frame coupling the left upper frame and the left lower frame together; and
a right coupling frame coupling the right upper frame and the right lower frame together.

7. The leaning vehicle according to claim 6, wherein
the upper frame includes an upper branch member including:
an upper proximal end connected to the link support;
a left upper branch branching from the upper proximal end and defining a portion of the left upper frame; and
a right upper branch branching from the upper proximal end and defining a portion of the right upper frame;
the lower frame includes a lower branch member including:
a lower proximal end connected to the link support;
a left lower branch branching from the lower proximal end and defining a portion of the left lower frame; and a right lower branch branching from the lower proximal end and defining a portion of the right lower frame;
the left coupling frame couples the left upper branch and the left lower branch; and
the right coupling frame couples the right upper branch and the right lower branch.

* * * * *